US012762768B2

(12) United States Patent
Weiss et al.

(10) Patent No.: US 12,762,768 B2
(45) Date of Patent: Oct. 13, 2026

(54) METHODS FOR AUTOMATICALLY GENERATING A COMMON MEASUREMENT ACROSS MULTIPLE ASSEMBLY UNITS

(71) Applicant: Instrumental, Inc., Palo Alto, CA (US)

(72) Inventors: Samuel Bruce Weiss, Sunnyvale, CA (US); Anna-Katrina Shedletsky, Sunnyvale, CA (US); John James Shedletsky, Sunnyvale, CA (US); Isaac Sukin, Sunnyvale, CA (US); Simon Kozlov, Sunnyvale, CA (US); Juyong Do, Sunnyvale, CA (US); Arseni Kravchenko, Warsaw (PL); Ken Hua, Sunnyvale, CA (US); Nic Weidinger, Sunnyvale, CA (US)

(73) Assignee: Instrumental, Inc., Palo Alto, CA (US)

( * ) Notice: Subject to any disclaimer, the term of this patent is extended or adjusted under 35 U.S.C. 154(b) by 247 days.

(21) Appl. No.: 18/623,890

(22) Filed: Apr. 1, 2024

(65) Prior Publication Data

US 2024/0257427 A1 Aug. 1, 2024

Related U.S. Application Data

(63) Continuation-in-part of application No. 18/230,105, filed on Aug. 3, 2023, now Pat. No. 12,373,931,
(Continued)

(51) Int. Cl.
*G06F 3/04845* (2022.01)
*G06F 3/04842* (2022.01)
(Continued)

(52) U.S. Cl.
CPC .......... *G06T 11/60* (2013.01); *G06F 3/04842* (2013.01); *G06F 3/04845* (2013.01);
(Continued)

(58) Field of Classification Search
CPC ....... G06F 2203/04806; G06F 3/04842; G06F 3/04845; G06F 3/0485; G06T 11/60;
(Continued)

(56) References Cited

U.S. PATENT DOCUMENTS 6,266,442 B1 * 7/2001 Laumeyer ............ G06V 10/443
382/104
8,477,154 B2 * 7/2013 Davis ........................ G09G 5/00
345/650

(Continued)

*Primary Examiner* — Tsung Yin Tsai
(74) *Attorney, Agent, or Firm* — Run8 Patent Group, LLC; Peter Miller

(57) ABSTRACT

A method includes: identifying a first set of key features in a first inspection image characterizing geometric properties of a set of predefined features; extracting a first set of real dimensions of the first set of key features from the first inspection image; projecting the first set of real dimensions proximal the first set of key features onto the first inspection image; receiving confirmation of a first subset of key features, in the first set of key features, from a user; identifying the first subset of key features in a second inspection image; identifying a second set of key features in the second inspection image characterizing properties of the set of predefined features, the second set of key features distinct from unconfirmed features in the first set of key features; and extracting a second set of real dimensions of the second set of key features from the second inspection image.

20 Claims, 7 Drawing Sheets

Related U.S. Application Data which is a continuation of application No. 17/855,130, filed on Jun. 30, 2022, now Pat. No. 12,020,415, application No. 18/623,890 is a continuation-in-part of application No. 17/491,213, filed on Sep. 30, 2021, now Pat. No. 12,190,418, said application No. 17/855,130 is a continuation of application No. 17/461,773, filed on Aug. 30, 2021, now Pat. No. 11,763,443, which is a continuation of application No. 16/506,905, filed on Jul. 9, 2019, now Pat. No. 11,132,787, said application No. 17/491,213 is a continuation of application No. 16/404,566, filed on May 6, 2019, now Pat. No. 11,164,304, which is a continuation of application No. 15/407,158, filed on Jan. 16, 2017, now Pat. No. 10,325,363.

(60) Provisional application No. 63/455,854, filed on Mar. 30, 2023, provisional application No. 62/695,727, filed on Jul. 9, 2018, provisional application No. 62/279,174, filed on Jan. 15, 2016.

(51) Int. Cl.

| | |
|---|---|
| ***G06F 3/0485*** | (2022.01) |
| ***G06T 7/00*** | (2017.01) |
| ***G06T 7/11*** | (2017.01) |
| ***G06T 7/13*** | (2017.01) |
| ***G06T 7/60*** | (2017.01) |
| ***G06T 11/60*** | (2006.01) |
| ***G06V 10/44*** | (2022.01) |

(52) U.S. Cl.

CPC .......... *G06F 3/0485* (2013.01); *G06T 7/0004* (2013.01); *G06T 7/001* (2013.01); *G06T 7/11* (2017.01); *G06T 7/13* (2017.01); *G06T 7/60* (2013.01); *G06V 10/44* (2022.01); *G06F 2203/04806* (2013.01); *G06T 2200/24* (2013.01); *G06T 2207/10004* (2013.01); *G06T 2207/10016* (2013.01); *G06T 2207/20092* (2013.01); *G06T 2207/20164* (2013.01); *G06T 2207/20221* (2013.01); *G06T 2207/30108* (2013.01); *G06V 2201/06* (2022.01)

(58) Field of Classification Search

CPC ....... G06T 2200/24; G06T 2207/10004; G06T 2207/10016; G06T 2207/20092; G06T 2207/20164; G06T 2207/20221; G06T 2207/30108; G06T 2207/30164; G06T 7/0004; G06T 7/001; G06T 7/11; G06T 7/13; G06T 7/60; G06V 10/44; G06V 2201/06

See application file for complete search history.

(56) References Cited

U.S. PATENT DOCUMENTS

| | | | | | |
|---|---|---|---|---|---|
| 10,198,808 | B2 * | 2/2019 | Weiss | G06T 11/60 | |
| 10,325,363 | B2 * | 6/2019 | Weiss | G06T 11/60 | |
| 2011/0058746 | A1 * | 3/2011 | Magai | G06V 10/25 | 382/195 |
| 2014/0050387 | A1 * | 2/2014 | Zadeh | G06T 7/0004 | 382/141 |
| 2015/0228063 | A1 * | 8/2015 | Minakawa | G06T 7/0002 | 382/151 |
| 2015/0279024 | A1 * | 10/2015 | Tsuchiya | G03F 1/84 | 382/144 |
| 2017/0206428 | A1 * | 7/2017 | Weiss | G06T 11/60 | |
| 2017/0206643 | A1 * | 7/2017 | Weiss | G06T 11/60 | |
| 2018/0300865 | A1 * | 10/2018 | Weiss | G06T 7/001 | |
| 2019/0259141 | A1 * | 8/2019 | Weiss | G06T 11/60 | |
| 2021/0201462 | A1 * | 7/2021 | Weiss | G06T 7/001 | |
| 2022/0241069 | A1 * | 8/2022 | Roberts | A61B 90/50 | |
| 2022/0375056 | A1 * | 11/2022 | Weiss | G06T 7/001 | |
| 2024/0257427 | A1 * | 8/2024 | Weiss | G06T 11/60 | |

* cited by examiner

METHODS FOR AUTOMATICALLY GENERATING A COMMON MEASUREMENT ACROSS MULTIPLE ASSEMBLY UNITS

CROSS-REFERENCE TO RELATED APPLICATIONS

This application claims the benefit of U.S. Provisional Application No. 63/455,854, filed on 30 Mar. 2023, which is hereby incorporated in its entirety by this reference.

This Application is a continuation-in-part of U.S. patent application Ser. No. 17/491,213, filed on 30 Sep. 2021, which is a continuation of U.S. patent application Ser. No. 16/404,566, filed on 6 May 2019, which is a continuation of U.S. patent application Ser. No. 15/407,158, filed on 16 Jan. 2017, which claims the benefit of U.S. Provisional Application No. 62/279,174, filed on 15 Jan. 2016, each of which is incorporated in its entirety by this reference.

This Application is a continuation-in-part of U.S. patent application Ser. No. 18/230,105, filed on 3 Aug. 2023, which is a continuation of U.S. patent application Ser. No. 17/855,130, filed on 30 Jun. 2022, which is a continuation of U.S. patent application Ser. No. 17/461,773, filed on 30 Aug. 2021, which is a continuation of U.S. patent application Ser. No. 16/506,905, filed on 9 Jul. 2019, which claims the benefit of U.S. Provisional Application No. 62/695,727, filed on 9 Jul. 2018, each of which is incorporated in its entirety by this reference.

TECHNICAL FIELD

This invention relates generally to the field of optical inspection and more specifically to new and useful methods for automatically generating a common measurement across multiple assembly units in the field of optical inspection.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
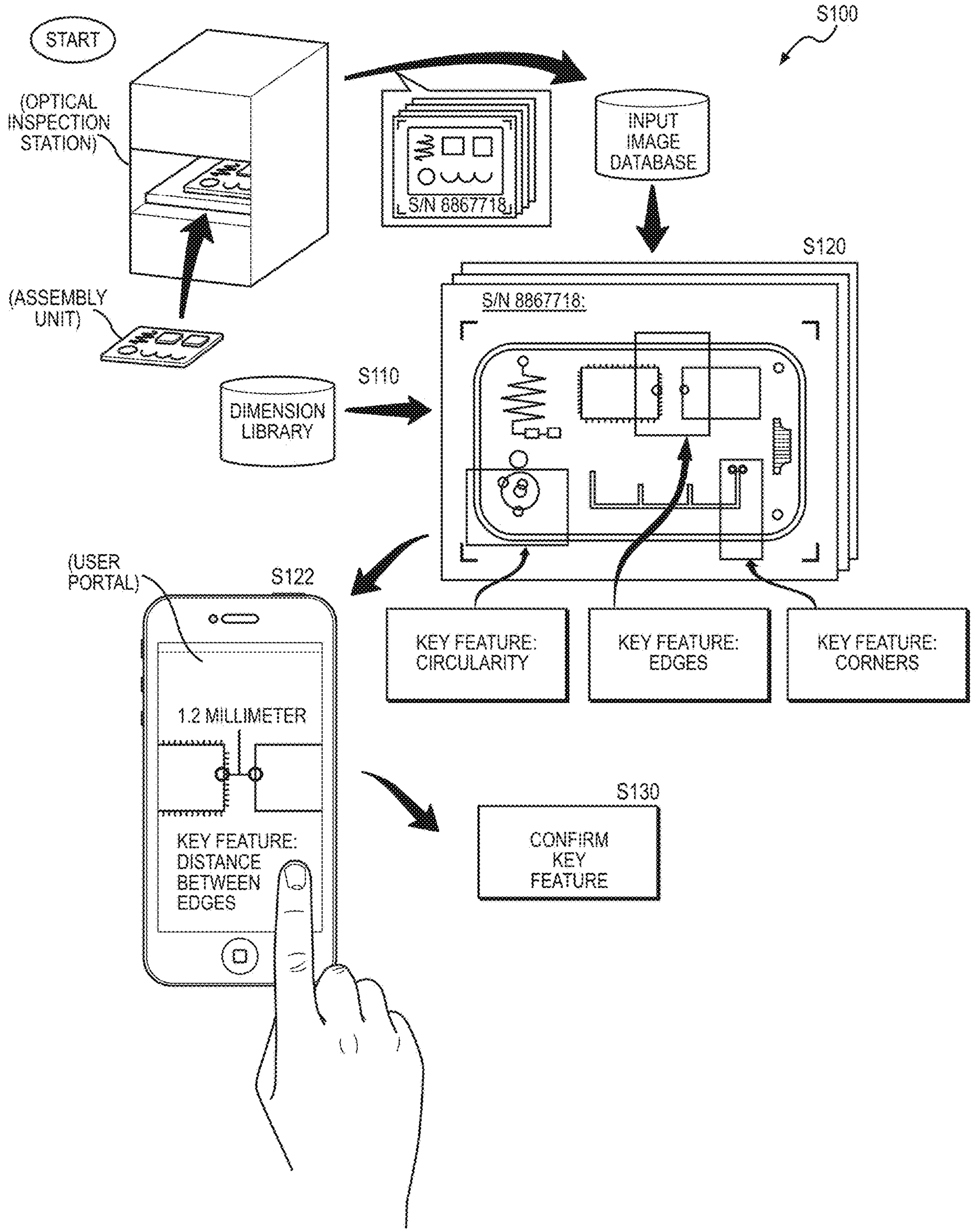
FIG. 1 is a flowchart representation of a method.
Figure 2:
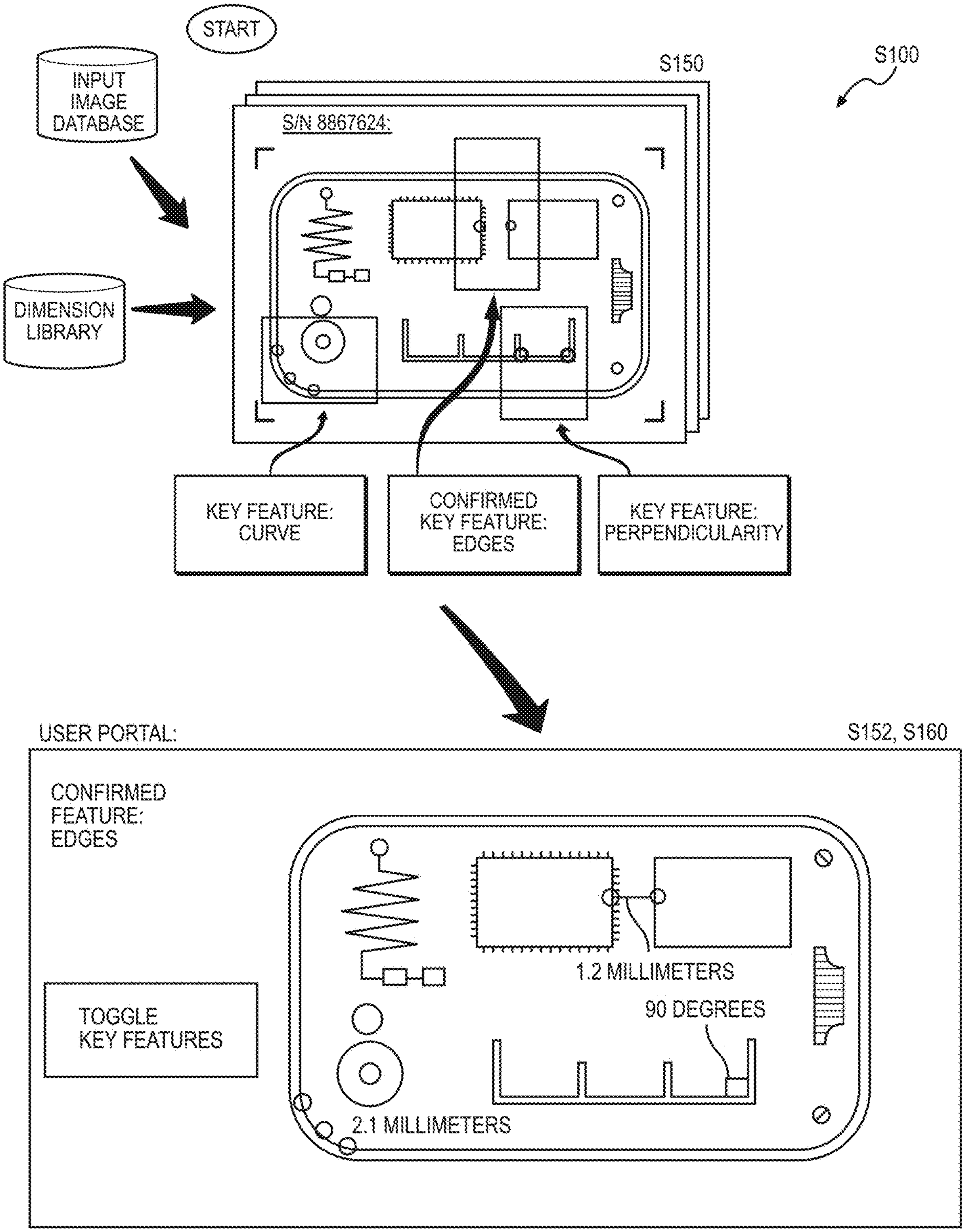
FIG. 2 is a flowchart representation of the method.
Figure 3:
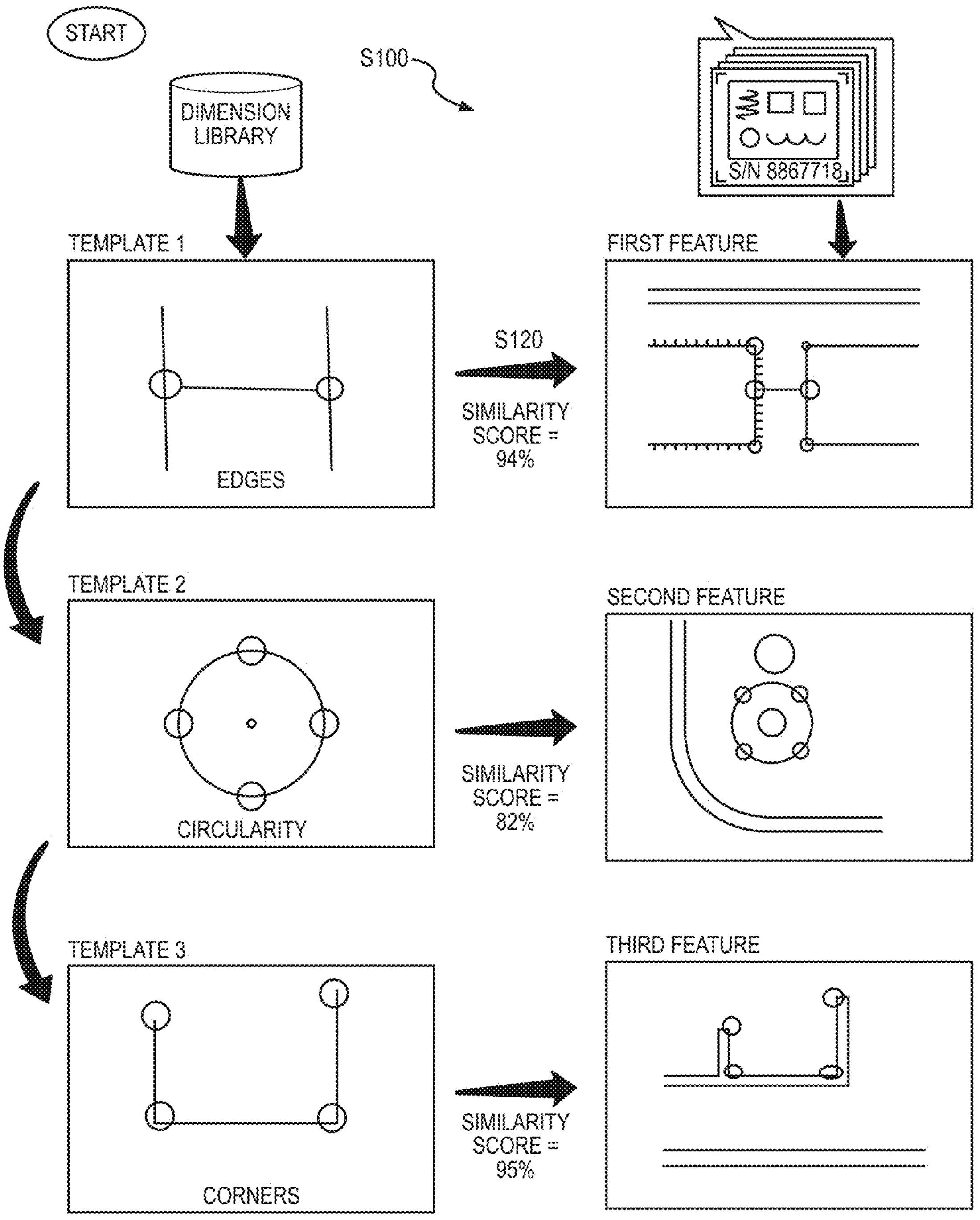
FIG. 3 is a flowchart representation of the method.
Figure 4:
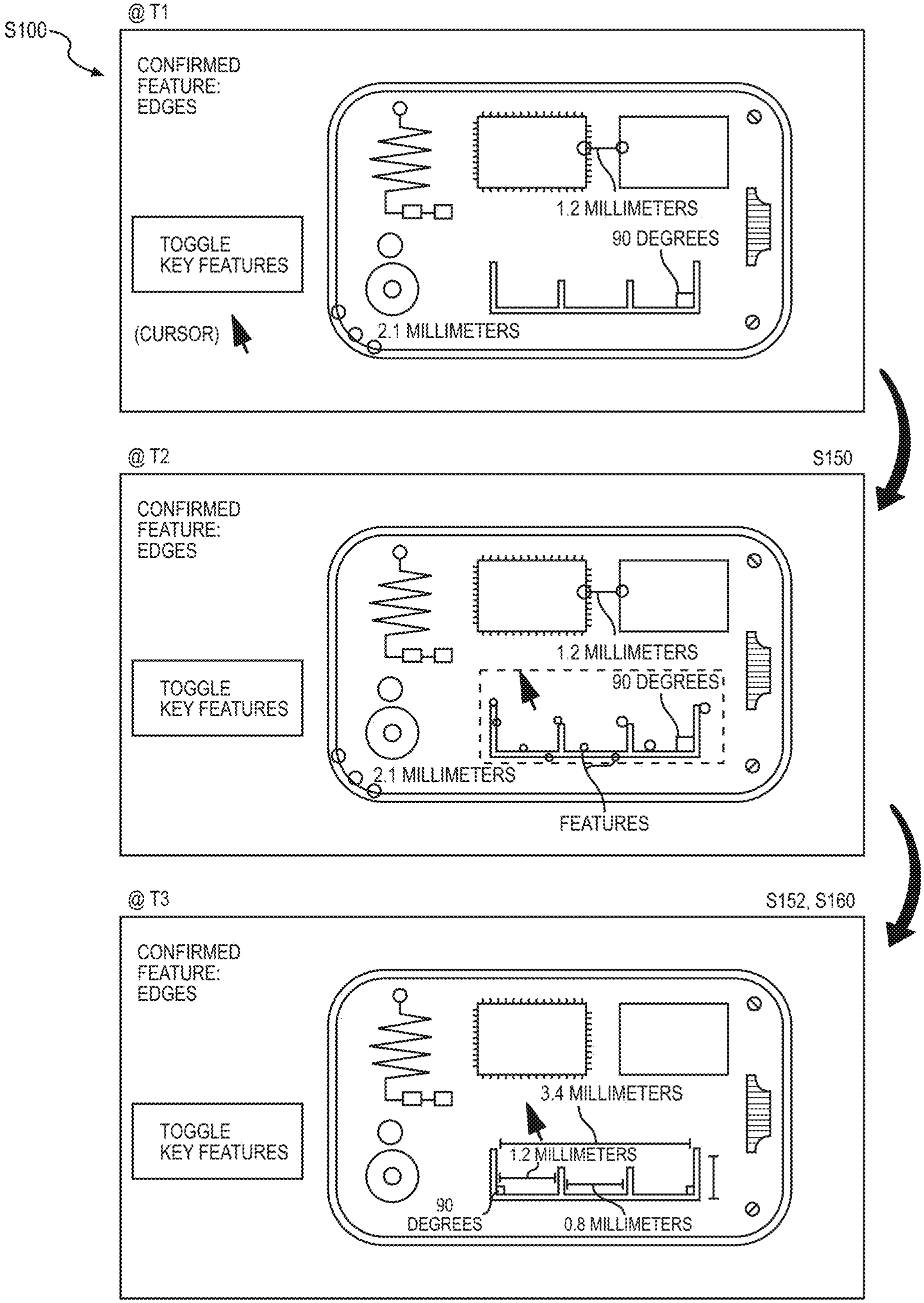
FIG. 4 is a flowchart representation of the method.
Figure 5:
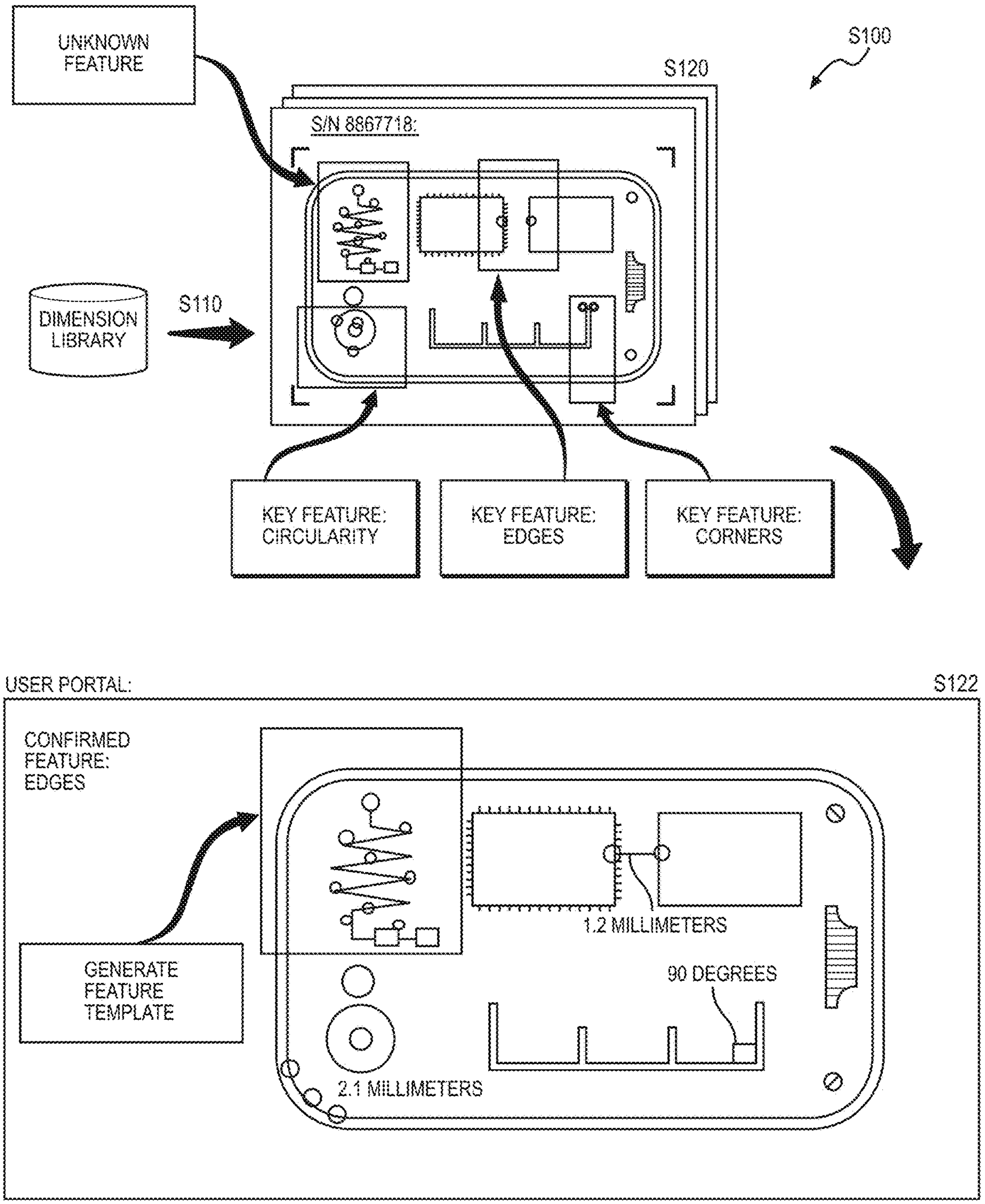
FIG. 5 is a flowchart representation of the method.
Figure 6A:
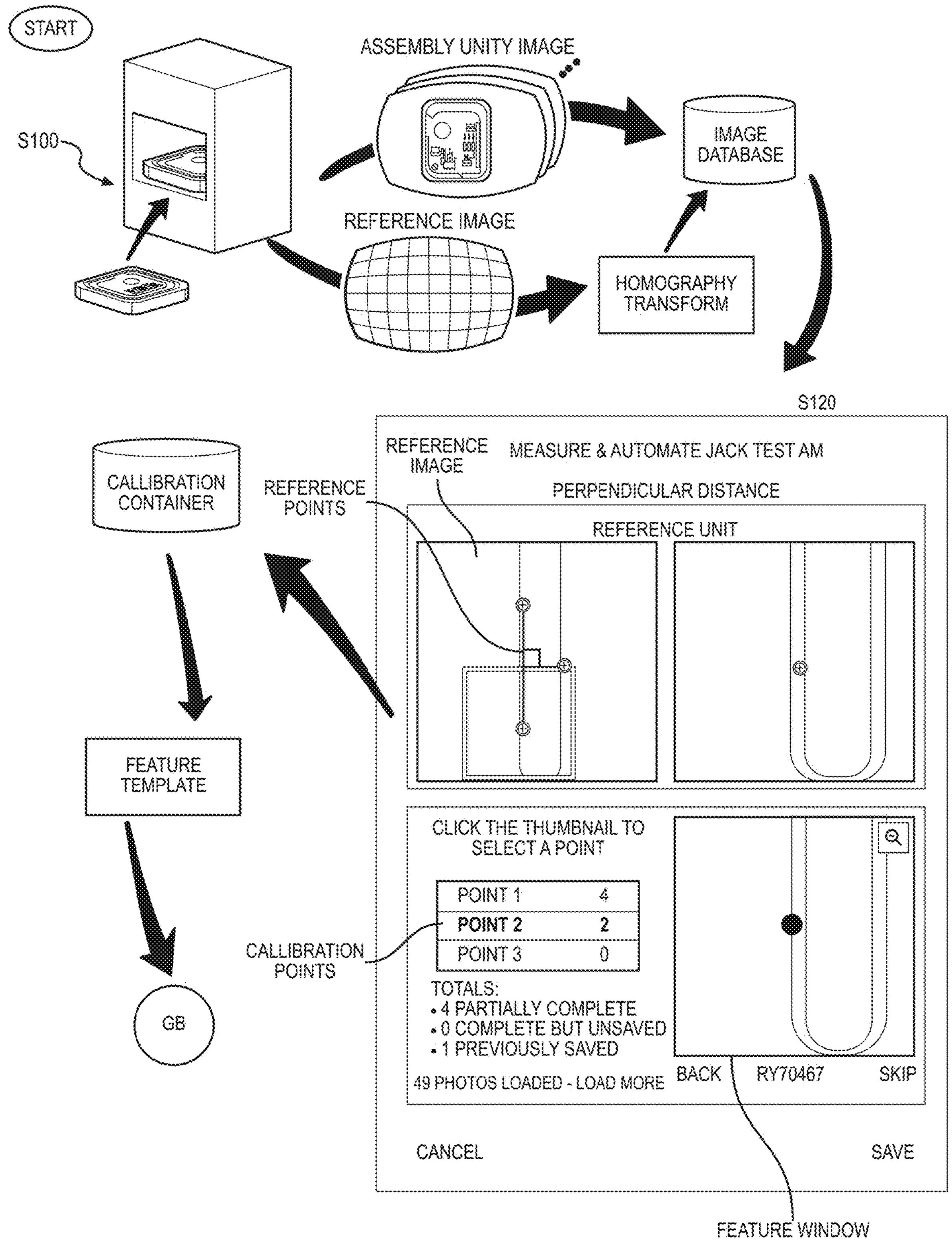
FIGS. 6A and 6B are flowchart representations of the method.
Figure 6B:
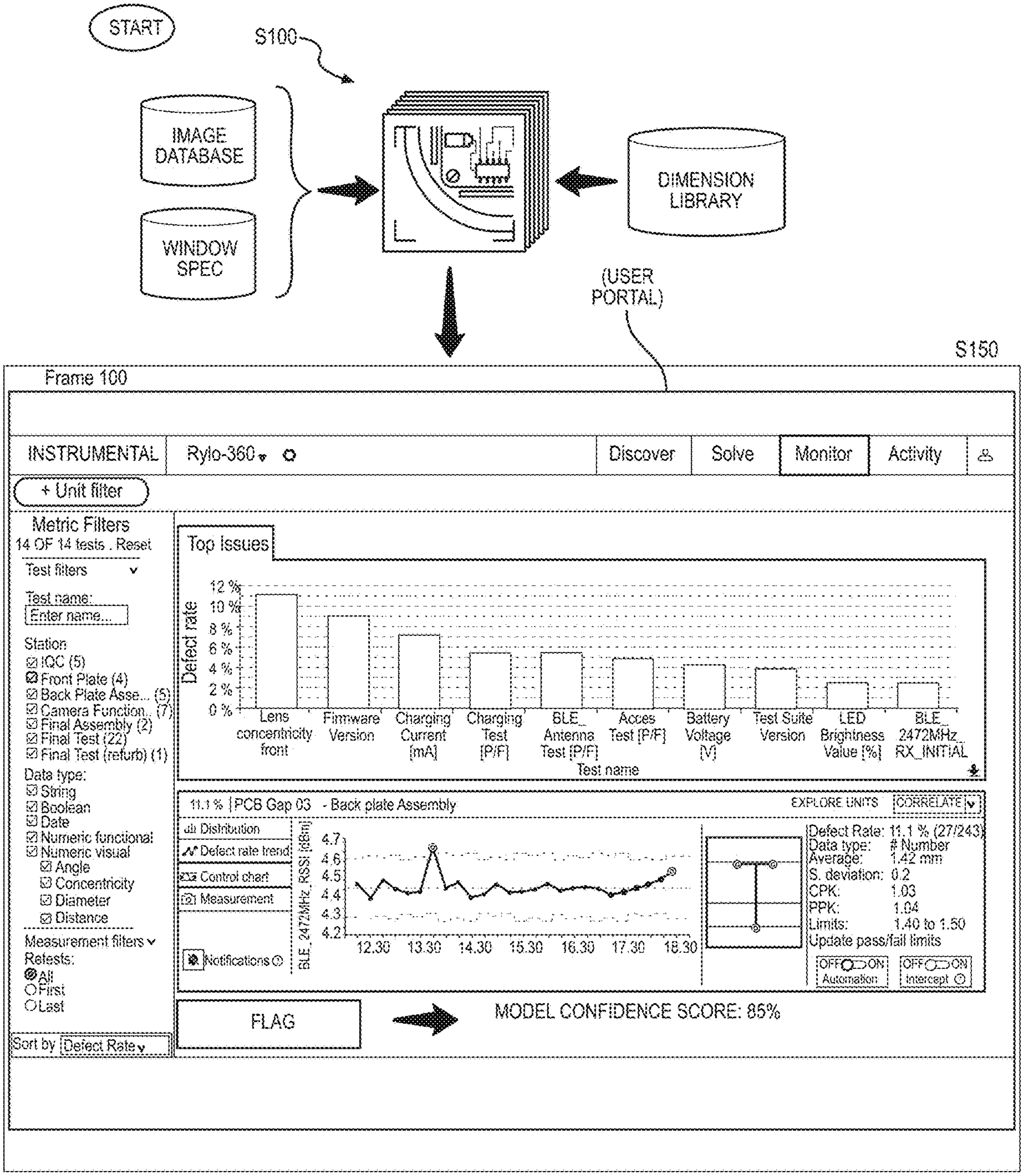

As shown in FIGS. 1 and 2, a method S100 for automatically measuring features across multiple assembly units includes: accessing a dimension library containing a set of feature templates associated with geometric characteristics of predefined features in recorded inspection images of assembly units in Block S110; and accessing a first inspection image of a first assembly unit.

The method S100 also includes, prior to presentation of the first inspection image to a user: predicting a first set of key features in the first inspection image based on the set of feature templates contained in the dimension library in Block S120; and extracting a first set of real dimensions of the first set of key features from the first inspection image in Block S122.

The method S100 further includes: presenting the first inspection image to the user via a user portal; projecting the first set of real dimensions proximal the first set of key features onto the first inspection image at the user portal in Block S130; and receiving confirmation of a first subset of key features, in the first set of key features, from the user at the user portal in Block S140.

The method S100 also includes: accessing a second inspection image of a second assembly unit; and, prior to presentation of the second inspection image to the user, predicting a second set of key features in the second inspection image in Block S150 based on the set of feature templates contained in the dimension library and the first subset of key features selected by the user. The second set of key features includes: the first subset of key features selected by the user; and a second subset of key features distinct from unconfirmed features in the first set of key features.

The method S100 further includes: extracting a second set of real dimensions of the second set of key features from the second inspection image in Block S152; presenting the second inspection image to the user via the user portal; and projecting the second set of real dimensions proximal the second set of key features onto the second inspection image at the user portal in Block S160.

2. Applications

Generally, a computer system (e.g., smartphone, a tablet, a desktop computer) can execute Blocks of the method S100 to: prior to presentation (e.g., rendering on a display) of an inspection image to a user, automatically predict features of interest (e.g., edges, corners, circles) in the inspection image based on known geometric properties of feature templates previously confirmed by the user; extract a set of real dimensions (e.g., distance measurement between two edges, distance measurement between two corners, length of a line profile, flatness of a surface, cylindricity of a bore, absolute position, orientation of a feature) of the set of features of interest from the inspection image; and, responsive to receiving a selection to view the inspection image by the user, render the set of real dimensions of the set of features of interest onto the inspection image for review by the user.

More specifically, the computer system can: access and/or maintain a dimension library-such as in internal memory or in a remote database-containing a set of feature templates (e.g., distance between edges template, circularity template, parallelism template) associated with geometric properties of predefined features in recorded inspection images of assembly units, such as: a feature template defining identification of edges and extraction of a distance between these edges; a feature template defining identification of edges and extraction of a parallelism or angular distance between these edges; a feature template defining identification of a curve and extraction of a radius of the curve; a feature template defining identification of a bore or circular feature and extraction of a cylindricity of the both or circular feature; etc.

The computer system can also access a first inspection image of a first assembly unit, such as recorded at an optical inspection station during production of the first assembly unit. The computer system can then, prior to presentation of the first inspection image to the user: implement computer vision techniques (e.g., object detection, feature extraction, edge detection) to extract a set of visual features (e.g., global visual features) from the first inspection image; implement machine learning techniques (e.g., regression, deep learning, reinforcement learning) to predict a subset of visual features, in the set of visual features, corresponding to key features (or "features of interest") in the first inspection image based on geometric characteristics of feature templates contained in the dimension library; set the subset of visual features as a first set of key features in the first inspection image predicted to be of interest during review of the first inspection image by the user; and extract a first set of real dimensions (e.g., distance measurement, length of a line profile, circumference of a circle) of the first set of key features in the first inspection image.

Thus, in response to receiving a selection to review the first inspection image by the user, the computer system can: present the first inspection image to the user, such as at the user portal associated with the user; and automatically render (or "project") the first set of real dimensions of the first set of key features onto the first inspection image at the user portal without manual selection of visual features in the first inspection image by the user.

Additionally, the computer system can: receive confirmation of a first subset of key features, in the first set of key features, in the first inspection image representing features of interest preferred by the user during review of the first inspection image; and leverage the confirmed first subset of key features and the dimension library to predict a second set of key features in a second inspection image of a second assembly unit. In particular, the computer system can, prior to presentation of the second inspection image to the user: access the second inspection image of a second assembly unit, such as recorded at an optical inspection station during production of the second assembly unit; implement computer vision techniques (e.g., object detection, feature extraction, edge detection) to identify the first subset of key features, confirmed by the user, in the second inspection image; and implement machine learning techniques (e.g., regression, deep learning, reinforcement learning), to predict a second subset of key features-distinct from (or "exclusive of") key features in the first set of key features not confirmed by the user—in the second inspection image based on geometric characteristics of feature templates contained in the dimension library.

The computer system can then: aggregate the first subset of key features confirmed by the user and the new second subset of key features into a second set of key features in the second inspection image; and extract a second set of real dimensions (e.g., distance measurement, length of a line profile, circumference of a circle) of the second set of key features in the second inspection image. Accordingly, in response to receiving a selection to review the second inspection image by the user, the computer system can: present the second inspection image to the user, such as via the user portal associated with the user; and automatically render (or "project") the second set of real dimensions of the second set of key features onto the second inspection image.

Therefore, rather than rendering a real dimension of a visual feature detected in an inspection image of an assembly unit responsive to manual selection of the visual feature by the user, the computer system can leverage geometric characteristics of known and confirmed features of interest-such as predefined in feature templates stored in a dimension library—to: predict a set of key features preferred by the user in the inspection image; extract a set of real dimensions of the set of key features from the inspection image; and automatically render the real dimensions of the set of key features onto the inspection images for review by the user. Additionally, the computer system can further interface with the user to updated and expand the dimension library based on features manually selected by the user, in addition to features automatically identified, dimensioned, and annotated by the computer system.

3. System

Blocks of the method S100 can be executed by a computer system, such as: locally on an optical inspection station (as described below) at which inspection images of assembly units are recorded; locally near an assembly line populated with optical inspection stations; within a manufacturing space or manufacturing center occupied by this assembly line; or remotely at a remote server connected to optical inspection stations via a computer network (e.g., the Internet), etc. The computer system can also interface directly with other sensors arranged along or near the assembly line to collect non-visual manufacturing and test data or retrieve these data from a report database associated with the assembly. Furthermore, the computer system can interface with databases containing other non-visual manufacturing data for assembly units produced on this assembly line, such as: test data for batches of components supplied to the assembly line; supplier, manufacturer, and production data for components supplied to the assembly line; etc.

The computer system can also interface with a user (e.g., an engineer, an assembly line worker) via a user portal-such as accessible through a web browser or native application executing on a laptop computer or smartphone—to serve prompts and notifications to the user and to receive defect labels, anomaly feedback, or other supervision from the user.

The method S100 is described below as executed by the computer system: to map a relationship between visual and non-visual features for an assembly type in time and space; to leverage these relationships to derive correlations between defects detected in assembly units of this type and visual/non-visual data collected during production of these assembly units; and to leverage these relationships to correlate visual anomalies in assembly units to non-visual root causes (and vice versa) based on visual and non-visual data collected during production of these assembly units. However, the method S100 can be similarly implemented by the computer system to derive correlations between visual/non-visual features and anomalies/defects in singular parts (e.g., molded, cast, stamped, or machined parts) based on inspection image and non-visual manufacturing data generated during production of these singular parts.

4. Optical Inspection Station

The computer system includes one or more optical inspection stations. Each optical inspection station can include: an imaging platform that receives a part or assembly; a visible light camera (e.g., a RGB CMOS, or black and white CCD camera) that captures images (e.g., digital photographic color images) of units placed on the imaging platform; and a data bus that offloads images, such as to a local or remote database. An optical inspection station can additionally or alternatively include multiple visible light cameras, one or more infrared cameras, a laser depth sensor, etc.

In one implementation, an optical inspection station also includes a depth camera, such as an infrared depth camera, configured to output depth images. In this implementation, the optical inspection station can trigger both the visible light camera and the depth camera to capture a color image and a depth image, respectively, of each unit set on the imaging platform. Alternatively, the optical inspection station can include optical fiducials arranged on and/or near the imaging platform. In this implementation, the optical inspection station (or a local or remote computer system interfacing with the remote database) can implement machine vision techniques to identify these fiducials in a color image captured by the visible light camera and to transform sizes, geometries (e.g., distortions from known geometries), and/or positions of these fiducials within the color image into a depth map, into a three-dimensional color image, or into a three-dimensional measurement space (described below) for the color image.

The computer system is described herein as including one or more optical inspection stations and generating a virtual representation of an assembly line including the one or more optical inspection stations. However, the computer system can additionally or alternatively include any other type of sensor-laden station, such as an oscilloscope station including NC-controlled probes, a weighing station including a scale, a surface profile station including an NC-controlled surface profile gauge, or a station including any other optical, acoustic, thermal, or other type of contact or non-contact sensor.

5. Automatic Configuration

Following insertion of a set of optical inspection stations into an assembly line, the optical stations can capture and upload color images of units passing through the optical inspection stations to a local or remote database. Upon receipt of an image from a deployed optical inspection station, the computer system can: implement optical character recognition techniques or other machine vision techniques to identify and read a serial number, barcode, quick-response ("QR") code, or other visual identifier of a unit within the image; generate an alphanumeric tag representing this serial number, barcode, QR code, or other visual identifier; and then add this alphanumeric tag to the metadata received with the image. The computer system can thus receive images of various units and then read identifying information of these units from these images. (Each optical inspection station can alternatively include an RFID reader, an NFC reader, or other optical or radio reader that locally reads a serial number from a unit placed on its imaging platform, and the optical inspection station can add a serial number read from a unit to metadata of an image of the assembly unit.)

The computer system can then process unit serial numbers, optical inspection station identifiers (e.g., serial numbers), and timestamps (i.e., times that units of known unit serial numbers entered optical inspection station of known identifiers) contained in metadata of images received from the optical inspection stations to determine the order of optical inspection stations along the assembly line. In one implementation, as images are received from optical inspection stations, the computer system: buckets a set of images containing a tag for a specific unit serial number; extracts optical inspection station serial number tags and timestamps from metadata in this set of images; and orders these optical inspection station serial numbers (from first to last in an assembly line) according to their corresponding timestamps (from oldest to newest). In particular, a unit progresses through assembly over time and is sequentially imaged by optical inspection stations along an assembly line, and the computer system can transform unit serial numbers, optical inspection station serial numbers, and timestamps stored with images received from these optical inspection stations into identification of a group of optical inspection stations as corresponding to one assembly line and confirmation of the order of the optical inspection stations along this assembly line. The computer system can repeat this process for other unit serial numbers-such as for eachserial number of a unit entering the first optical inspection station in this ordered set of optical inspection stations—in order to confirm the determined order of optical inspection stations along an assembly line and to automatically detect reconfiguration of optical inspection stations on the assembly line (e.g., in real-time).

In this implementation, the computer system can also pass these optical inspection station serial numbers into a name mapping computer system (e.g., a DNS) to retrieve optical inspection station-specific information, such as make, model, last user-entered name, configuration (e.g., imaging platform size, optical resolution, magnification capacity), owner or lessee, etc. for each optical inspection station. The computer system can similarly pass unit serial numbers into a name mapping computer system or other database to retrieve unit-specific data, such as assigned build, configuration, bill of materials, special assembly instructions, measurements, photographs, notes, etc.

The computer system can then generate a virtual representation of the ordered optical inspection stations along an assembly line. The computer system can label virtual representations of the optical inspection stations with a make, model, name, configuration, serial number, etc. retrieved from a remote database or according to a name or description entered by a user. The computer system can then upload the virtual representation of the assembly line to a local or remote computer system (e.g., a smartphone, a tablet, a desktop computer) for access by a user. The computer system can also receive images from optical inspection stations across multiple distinct assembly lines and can implement the foregoing methods and techniques substantially in real time to bucket images of units on different assembly lines, to identify multiple assembly lines and optical inspection station order in each assembly line, to generate a unique virtual representation of each assembly line represented by the images, and to distribute these virtual assembly line representations to their corresponding owners.

The computer system can also repeat the foregoing methods and techniques throughout operation of the assembly line in order to detect insertion of additional optical inspection stations into the assembly line, to detect removal of optical inspection stations from the assembly line, and/or to detect rearrangement of optical inspection stations within the assembly line and to automatically update the virtual representation of the assembly line accordingly.

6. Assembly Line Status

The computer system can identify the current position of a unit within the assembly line based on the optical inspection station serial number tag stored with the last image-containing a unit serial number for the assembly unit-received from the assembly line. For example, for a unit within the assembly line, the computer system can determine that a particular unit is between a first optical inspection station and a second optical inspection station along the assembly line if the last image containing a unit serial number tag for the particular unit was received from the second optical inspection station (i.e., contains an optical inspection station serial number tag for the first optical inspection station). In this example, the computer system can determine that the particular unit is at the second optical inspection station along the assembly line if the last image containing the assembly unit serial number tag for the particular unit was recently received from the second optical inspection station by another image of another unit that has not yet been received from the second optical inspection station. Furthermore, in this example, the computer system can determine that assembly of the particular unit has been completed if the last image containing the assembly unit serial number tag for the particular unit was received from a last known optical inspection station on the assembly line.

The computer system can repeat the foregoing process for unit serial numbers of other units identified in images received from the optical inspection stations inserted along an assembly line. The computer system can then populate the virtual representation of the assembly line described above with a heat map of current unit position. As each new image is received from an optical inspection station on the assembly line and a new position of a particular unit along the assembly line thus determined, the computer system can update the virtual representation of the assembly line to reflect the new determined position of the particular unit. The computer system can also pulse or otherwise animate a marker representative of the particular unit within the virtual representation of the assembly line to visually indicate to a user that the particular unit has moved.

The computer system can implement similar methods and techniques to generate a heat map or other virtual representation of the assembly line at a particular previous time selected by a user based on last images of units received from optical inspection stations along the assembly line prior to the particular previous time. The computer system can therefore recalculate assembly line states and unit positions at previous times and display virtual representations of these assembly line states for the user substantially in real-time as a user scrolls through a time history of the assembly line. The computer system can also filter images received from optical inspection stations, such as by build, configuration, date or time, inspection time, etc. based on a user selection for a subset of units on the assembly line; the computer system can then calculate an assembly line state for the subset of units from the filtered images and display a virtual representation of this assembly line state.

However, the computer system can transform images received from optical inspection stations into a configuration of optical inspection stations along an assembly line and to determine a state of units along the assembly line.

7. Defect Detection

In one variation, the computer system implements machine vision techniques to detect manufacturing defects along the assembly line and augments the virtual representation of the assembly line with locations, types, and/or frequencies of manufacturing defects detected in units passing through the assembly line. For example, the computer system can implement methods and techniques described below to analyze images of units to detect features (e.g., component dimensions, absolute or relative component positions) that fall outside of dimensions and tolerances specified for the feature. In another example, the computer system can implement template-matching techniques to detect scratches, dents, and other aesthetic defects on units in images received from optical inspection stations along the assembly line.

In this variation, when a defect on a unit is detected in an earliest image of the assembly unit, the computer system can flag a unit serial number corresponding to the image in which the defect was detected and then insert a defect flag into the virtual representation of the assembly at a particular optical inspection station at which this image was captured. The computer system can thus visually indicate to a user through the virtual representation of the assembly line that the defect on the assembly unit occurred between the particular optical inspection station and a second optical inspection station immediately preceding the particular optical inspection station in the assembly line. Furthermore, if the computer system detects defects shown in multiple images captured at a particular optical inspection station, the computer system can identify defects of the same type (e.g., similar scratches in the same area on a housing across multiple units) and incorporate a counter for defects of the same defect type into the virtual representation of the assembly line. The computer system can also visually represent frequency, type, and/or position of detected defects across a batch of units passing through one or more optical inspection stations, such as in the form of a heatmap For example, the computer system can generate or access a virtual representation of a "nominal" e.g., "generic") unit, calculate a heatmap containing a visual representation of aggregate defects detected in like units passing through a single optical inspection station or passing through multiple optical inspection stations in the assembly line, and then present the heatmap overlayed on the virtual representation of the nominal unit within the user interface.

However, the computer system can implement any other method or technique to identify a defect in a unit shown in an image captured by an optical inspection station within an assembly line and to indicate the earliest detected presence of this defect on the assembly unit in the virtual representation of the assembly line.

8. Images

Generally, the computer system retrieves a first image of a first assembly unit and presents this first image to the user through the user interface; at the user interface, the user may then zoom in to various regions of the first image and shift the first image vertically and horizontally within a zoom window to visually, remotely inspect regions of the first assembly unit represented in these regions of the first image.

8.1 Homography Transform

In one implementation, the computer system retrieves a first digital photographic image-previously recorded by an optical inspection station during an assembly period—from a database. The computer system then normalizes the first digital photographic image to generate the first image that can then be presented to the user at the user interface. For example, the optical inspection station can include a digital photographic camera and a wide-angle lens coupled to the digital photographic camera; images recorded by the optical inspection station may therefore exhibit perspective distortion. During setup of the optical inspection station, a reference object defining a reference surface-such as a 300-millimieter-square white planar surface with black orthogonal grid lines at a known offset distance of 10 millimeters—can be placed within the optical inspection station, and the optical inspection station can record a "reference image" of the reference surface and upload the reference image to the remote database. The computer system can then: retrieve the reference image; implement computer vision techniques to identify warped grid lines in the reference image; and then calculate an homography transform that maps warped grid lines in the reference image to straight, orthogonal grid lines. In this example, the computer system can also calculate a scalar coefficient that relates a digital pixel to a real dimension (i.e., a length value in real space) based on the known distances between grid lines on the reference surface. Therefore, the computer system can apply the homography transform to the first digital photographic image to generate the "flattened" (or "dewarped") first image and then display the first image-now with perspective distortion removed-within the user interface for presentation to the user. As described below, the computer system can also extract a real dimension of a feature of the first assembly unit from the first image by summing a number of pixels in the first image spanning the feature and then multiplying this number of pixel by the scalar coefficient.

In the foregoing implementation, the computer system can transform all other digital photographic images recorded at the same optical inspection station during an assembly period for a particular assembly type at a particular assembly stage according to the same homography transform; the computer system can also apply the same scalar coefficient to the resulting flattened images. For example, upon receipt of a new digital photographic image from the optical inspection station, the computer system can: immediately calculate a corresponding flattened image based on the homography transform that is specific to this optical inspection station; and then store the original digital photographic image and the corresponding flattened image together in the database. As described below, the computer system can also generate a measurement space for the original digital photographic image, a compressed form (e.g., a thumbnail) of the flattened image, a feature space for the flattened image, and/or other images, spaces, or layers related to the digital photographic image or the flattened image and store these data together (e.g., in one file associated with the corresponding assembly unit) in the database. Alternatively, the computer system can store the digital photographic image in the database and then generate the corresponding flattened image in real time when review of the corresponding assembly unit is requested at the user interface.

8.2 Set of Images

The computer system can define a set of related images by assembly units represented in these images. For example, an optical inspection station can store a timestamp and an optical inspection station identifier in metadata of an image; the computer system can also write an assembly type and an assembly stage to the image metadata based on the known location of the optical inspection station along an assembly line. The computer system can also implement computer vision techniques to read a serial number or other optical identifier from a region of the image representing an assembly unit or a fixture locating the assembly unit with the optical inspection station and can write this serial number or other identifier to the image metadata. Furthermore, the computer system can determine a configuration of the assembly unit represented in the image based on the timestamp, serial number, and/or assembly stage, etc. of the assembly unit and write this configuration to the image metadata. Similarly, the computer system can implement computer vision techniques (e.g., template matching, pattern matching, object recognition) to extract an assembly type and/or an assembly state of the assembly unit represented in the image directly from the image. The computer system can repeat this process asynchronously for images stored in the database and in (near) real-time for new images received from deployed optical inspection stations.

The computer system can then apply various filters to metadata stored with these images to define a set of related images. For example, the computer system can automatically aggregate all images recorded at one optical inspection station during one assembly period or "build" (e.g., EVT, DVT, or PVT) to define the set of images. Similarly, the computer system can select—from a body of images recorded across a set of optical inspection stations and representing multiple assembly units in various assembly states—a set of images representing a set of assembly units of the same assembly type and in the same assembly state. The computer system can also receive a set of filter parameters from the user-such as time window, configuration, build, assembly stage, and/or other filters, as described below- and populate the set of images according to the filter. Furthermore, the computer system can order images in the set, such as by timestamp orserial number, and display these images in this order as the user scrolls through the set of images within the user interface.

9. View Window

Generally, the computer system receives an input at the user interface, interprets this input as a command to change the view window of the first image currently rendered within the user interface, and updates the view window accordingly.

In one implementation, the computer system initially displays the full height and width of the first image within the user interface. Upon receipt of a zoom input—such as via a scroll wheel, selection of a zoom level from a drop-down menu, or a zoom level slider—at the user interface, the computer system redefines a view window to encompass a smaller region of the first image and renders the smaller region of the first image bound by this view window at higher resolution within the user interface. The computer system can then implement methods and techniques described below to select a virtual origin within this new view window and to define geometry and location parameters of the view window relative to the virtual origin.

Once zoomed into the first image, the user may drag or shift the first image vertically or horizontally relative to the view window. The computer system can then select a new virtual origin within the revised view window and/or redefine geometry and location parameters of the revised view window relative to the current virtual origin. Following a change in zoom level and each change in position of the first image relative to the view window, the computer system can implement this process automatically: to update a region of the first image and a resolution of this region displayed in the user interface; to reselect a virtual original of the first image (e.g., if the previous virtual origin is not longer within the view window); and to automatically recalculate geometry and location parameters of the view window relative to the current virtual origin.

Alternatively, the computer system can: automatically update a region of the first image and a resolution of this region displayed in the user interface in real-time in response to a change in zoom level and position of the first image within the view window; and select a virtual original of the first image and recalculate geometry and location parameters of the view window relative to the virtual origin selectively in response to manual entry-through the user interface—of a command to store the current view window and to populate the view window across other images in the set.

However, the computer system can implement any other methods or techniques to update a region and resolution of the first image rendered within the user interface and to automatically or selectively trigger selection of a virtual origin in the first image and recordation of view window parameters.

10. First Image: Origin Selection

Generally, the computer system locates a virtual origin within the first image relative to (e.g., on) a distinguishable feature within the first image; the computer system can then define the view window for the current region of the first image rendered in the user interface relative to this virtual origin. Because the computer system locates the virtual origin at a distinguishable feature within the first image, the computer system can implement computer vision techniques to identify analogous (e.g., similar) distinguishable features in other images in the set and to similarly locate virtual origins relative to (e.g., on) these analogous features. By rendering images in the set with their virtual origins at the same position within the user interface and at the same scale and resolution as the first image, the computer system can preserve a view window set for the first image across other images in the set, thereby enabling the user to view (e.g., scroll through) regions of images of different assembly units positioned relative to a common feature represented in these images.

In particular, locations of like parts, components, and subassemblies may not be positioned in identical locations and orientations-relative to the global assembly unit and to other parts, components, and subassemblies within the assembly unit-across a group of assembly units assembled along the same assembly line over time. Furthermore, a fixture configured to constrain an assembly unit within an optical inspection station may exhibit a non-zero location tolerance such that assembly units captured in a sequence of images may be noticeably offset from one image to the next. To preserve a view window from a first image of a first assembly unit to a second image of a second assembly unit, the computer system can define a first virtual coordinate computer system within the first image, such as including a virtual origin and a virtual axis, and define the view window relative to this first virtual coordinate computer system. The computer system can then define a similar second virtual coordinate computer system in the second image, such as relative to like features of the first and second assembly units captured in these two images, and project the view window onto the second image based on the second virtual coordinate computer system. By defining reference coordinate computer systems across the set of images relative to or based on like features in assembly units represented in the set of images, the computer system can display these like features in the same position within the user interface, thereby enabling the user to quickly, visually distinguish differences in the relative positions of other features in these assembly units relative to these like features as the user indexes through this set of images within the user interface.

11. View Window Specification: Last Viewed Area Parameters

Generally, the computer system records parameters characterizing the current view window on the first image relative to the virtual origin and/or virtual axis defined for the first image. In particular, the computer system can record a geometry and a position of the current view window-defining a region of the first image currently rendered within the user interface-relative to the virtual origin of the first image. The computer system can then store these data in a new view window specification.

In one implementation, as the user zooms into and out of the first image and repositions the first image vertically and horizontally in the user interface, the computer system can store parameters defining the last area of the first image rendered in the user interface. For example, the computer system can store: the pixel width and pixel height of a rectangular region of a first image rendered in the user interface; the horizontal and vertical pixel offsets of the upper-left corner between this rectangular region and the virtual origin of the first image; and an angular offset between one edge of the rectangular region and the virtual axis of the first image in the new view window specification. In another example, the computer system can store the pixel coordinates of each corner of the rectangular region of the first image rendered in the user interface relative to a virtual coordinate computer system defined by the virtual origin and the virtual axis in the first image. The computer system can implement these parameters to project the view window for the first image onto other images in the set of images.

The computer system can also write a zoom level at which the first image is currently being viewed and/or a ratio of real dimension to pixel size for the current zoom level. The computer system can implement these data to set a zoom level for other images in the set or to scale these images to match the zoom level or scale of the first image.

The computer system can also store a location of the feature(s) selected to define the virtual origin and the virtual axis in the first image and/or a location of a narrow feature window containing this feature(s) within the first image, such as relative to the upper-leftmost corner of the first image, relative to a datum or other reference fiducial on the fixture shown in the first image, or relative to another global origin of the first image. Similarly, the computer system can characterize this feature(s), such as by categorizing the feature as a corner, line, curve, arc, or surface and calculating a length, radius, or area of the feature (e.g., in pixel-based units or real units). For example, the computer system can store these parameters in the new view window specification. The computer system can then implement these parameters to identify like features in other images and to locate comparable virtual origins and virtual axes in these other images.

However, the computer system can store any other set of values representing the size and position of a region of the first image last rendered in the user interface.

Furthermore, the computer system can implement similar methods and techniques to locate the view window of the first image relative to a feature or set of features within the first image directly, such as rather than relative to an origin or coordinate computer system located on a feature.

12. Second Image: Origin Selection

Generally, the computer system automatically identifies a second feature—in a second image of a second assembly unit-analogous (e.g., similar in position and geometry) to a first feature selected in the first image to define a first virtual origin and/or first virtual axes in the first image. Once this second feature in the second image is identified, the computer system can define a second virtual origin and second virtual axes for the second image based on this second feature. In particular, when the user scrolls from the first image to the second image, the computer system implements methods and techniques described above to automatically identify a second reference feature in the second image substantially identical to the first reference feature selected in the first image and to automatically define a virtual origin in the second image according to this second reference feature.

In one example, the computer system can then repeat this process for all other images in the set, the next five images and five preceding images in the set of images, or the next image and the preceding image in the set each time the user adjusts the view window of the first image or saves a new view window specification. Alternatively, the computer system can identify an analogous feature in a second image once the user advances (e.g., scrolls, tabs forward or backward) from the first image to the second image.

13. View Window Projection and Display

Generally, the computer system selects a region of the second image to initially render within the user interface based on a set of parameters defining the last region of the first image previously rendered within the user interface. In particular, the computer system projects the last view window of the first image onto the second image based on the second virtual origin of the second image to define an analogous view window for the second image. Therefore, when the computer system replaces the region of the first image bound by the view window with the second image bound by the analogous view window within the user interface, the second feature in the second image—which is analogous to the first feature in the first image—is rendered at the same location and in the same orientation within the user interface as was the first feature immediately prior. Therefore, the computer system can locate coordinate computer systems in the first and second images respectively, based on analogous reference features common to the first and second image and project a view window from the first image onto the second image such that the reference feature in the second image is aligned in translation and rotation with its analogous reference feature in the first image when the subregion of the second image is rendered within the user interface in replacement of the subregion of the first image. For example, the computer system can render the subregion of the second image in the user interface substantially in real-time as the user scrolls from the first image to the second image. The computer system can then repeat this process as the user scrolls from the second image back to the first image or from the second image to a third image—of a third assembly unit—in the set of images.

In one implementation, the computer system: defines a geometry of a view window for the second image according to the zoom level stored in the new view window specification; vertically offsets an origin of the view window from the second virtual origin in the second image according to a vertical offset stored in the new view window specification; horizontally offsets the origin of the view window from the second virtual origin in the second image according to an horizontal offset stored in the new view window specification; rotates the view window relative to the second coordinate computer system in the second image according to an angular offset stored in the new view window specification; and defines a region of the second image bound by the new view window as the second subregion. The computer system can therefore both translate and rotate the view window in the second image to align with the view window in the first image to compensate both for variations in local positions and orientations of parts within the first and second assembly units and global variations in the positions and orientations of the first and second assembly units within the optical inspection station when the first and second images were recorded. The computer system can then display the second subregion of the second image within the user interface in replacement of the first subregion of the first image.

Alternatively, the computer system can implement similar methods and techniques to locate the view window from the first image onto a second image relative to a second feature or set of features within the second image. However, the computer system can implement any other method or technique to project the view window of the first image onto the second image and to display the corresponding region of the second image within the user interface with the reference feature of the second image aligned to the analogous reference feature of the first image previously displayed in the user interface.

14. View Window Propagation

In one variation, the computer system serves an indicator of the second feature, the second virtual origin, and/or the second virtual axis automatically selected for the second image and a prompt to confirm these selections to the user through the user interface. Upon receipt of confirmation of these selections from the user, the computer system can replicate the process implemented for all other images in the set.

In one implementation, once the computer system automatically selects a geometry and a position of the second subregion of the second image and renders the second subregion of the second image within the user interface, the computer system serves a prompt to confirm this geometry and position of the second subregion to the user through the user interface before executing these processes for other images in the set. If the user indicates through the user interface that this geometry and position are incorrect—such as angularly offset, shifted vertically or horizontally, or improperly scaled relative to the first subregion of the first image displayed previously—the computer system can: repeat this process for the second image to recalculate the geometry and position of the second subregion of the second image; display this revised second subregion of the second image in the user interface; and similarly prompt the user to confirm the geometry and position of the revised second subregion. Upon receipt of an indication that the second subregion of the second image is improper, the computer system can also prompt the user to select an alternate second feature in the second image and/or indicate a preferred origin, axis, and/or coordinate computer system for the second image, such as by selecting an alternate pixel within the second image or selecting an alternate feature from a second feature space laid over the second image as described above. The computer system can then revise the second subregion of the second image and update a process for propagating the view window across the set of images, such as stored in the new view window specification, according to these additional selections entered by the user. For example, the computer system can implement machine learning techniques to refine a process or model for automatically selecting analogous features, locating virtual origins, and orienting virtual axes across a set of related images based on feedback provided by the user.

However, in response to receipt of confirmation of the projected geometry and the projected position of the second subregion of the second image, the computer system can: retrieve the set of images of other assembly units from the database; locate a virtual origin in each image in the set of images; and project the geometry and the position of the first subregion of the first image onto each image in the set of images to define a set of subregions for the set of images. In particular, once the user confirms that the computer system correctly defined the second subregion in the second image, the computer system can propagate the last view window of the first image, such as defined in the new view window specification, across all images in the set. The computer system can then index through the set of subregions displayed within the user interface in response to a scroll input at the user interface as described above. However, the computer system can implement any other methods or techniques to prompt, collect, and respond to user feedback related to automatic selection of the second subregion of the second image.

As described above, the computer system can repeat this process for all remaining images in the set once the user confirms the second subregion of the second image, such as before the user scrolls to or selects a next image in the set. Alternatively, the computer system can execute the foregoing methods and techniques to propagate the last view window of the first image to images in the set in real-time as the user indexes forward and backward to these other images within the user interface.

15. Composite Image

Generally, in this variation, the computer system can: virtually stack two (or more images)—from the set of images—with their analogous features or analogous-feature-based coordinate computer systems in alignment; reduce the opacity of these images to form a composite image; and display this composite image within the user interface. Thus, when viewing the composite image, the user may view deviations in positions and geometries of like components (e.g., housings, sub-assemblies, parts, subparts) of assembly units represented in these images related to a common reference feature.

For example, the computer system can: set a first opacity of the first subregion of the first image; set a second opacity of the second subregion of the second image; overlay the second subregion over the first subregion to generate a composite image; and display the composite image within the user interface. The computer system can apply a static opacity, such as 50% opacity, to each image when generating the composite image. Alternatively, the computer system can enable the user to dynamically adjust the opacity of images represented in the composite image and then update the composite image rendered in the display accordingly. For example, the computer system can: present a slider bar adjacent the composite image displayed in the user interface; adjust the first opacity of the first image according to a change in the position of a slider on the slider bar; adjust the second opacity of the second image as an inverse function of the first opacity; and refresh the composite image accordingly.

The computer system can implement similar methods and techniques to align and combine two or more whole images from the set of images into a composite image.

In another implementation, the computer system generates a composite image from an image of a real assembly unit and an image of a graphical model representing an assembly unit. In this implementation, by aligning an image of a real assembly unit to an image of the graphical model that represents the assembly unit within a single composite image and then rendering this composite image within the user interface, the computer system can enable the user to quickly visually distinguish differences in component positions and orientations between the real assembly unit and a nominal representation of the assembly unit defined in the graphical model. For example, the computer system can: retrieve a virtual three-dimensional computer-aided drafting ("CAD") model representing the first assembly unit; generate a two-dimensional CAD image of the CAD model at an orientation and in a perspective approximating the orientation and position of the first assembly unit represented in the first image; locate a third virtual origin at a third feature-analogous to the first feature on the first assembly unit—in the CAD image, such as by implementing methods and techniques as described above; projecting the geometry and the position of the first subregion of the first image onto the virtual CAD model according to the third virtual origin to define a third image, such as by implementing methods and techniques as described above; and then display a translucent form of the third image over the first subregion of the first image within the user interface. Thus, in this example, the computer system can align the CAD image to the first image in rotation and translation by a real feature on the real assembly unit represented in the first image and a graphical feature representing the real feature in the CAD model.

Alternatively, the computer system can implement similar methods and techniques to: generate a CAD image; project the view window from the first image onto the CAD image to define a subregion of the CAD image analogous to the first subregion of the first image; and to display the subregion of the CAD image within the user interface independently of the first image, such as when the user scrolls from the first image to the CAD image while the new view window specification is active.

16. One Assembly Unit at Different Assembly Stages

In one variation, the computer system implements similar methods and techniques to preserve a viewing window across a set of images of a single assembly unit throughout a sequence of assembly stages. For example, the computer system can assign a virtual origin to a first image based on a feature corresponding to a largest physical body shown in the first image (e.g., a corner of a PCB, a corner or perpendicular sides of a rectangular housing). In this example, the computer system can identify the same feature in other images of the assembly unit at various assembly stages and assign like virtual origins to these other images.

In this variation, the second method S200 can include: displaying a first image of an assembly unit in a first stage of assembly within a user interface, the first image recorded at a first optical inspection station; locating a first virtual origin in the first image at a feature on the assembly unit represented in the first image; in response to receipt of a zoom input at the user interface, displaying a first subregion of the first image within the user interface; storing a geometry and a position of the first subregion of the first image relative to the first virtual origin; identifying the feature on the assembly unit in a second image of the assembly unit in a second stage of assembly; locating a second virtual origin in the second image according to the feature; defining a second subregion of the second image based on the geometry and the position of the subregion of the first image and the second virtual origin; and, in response to receipt of a command to advance from the first image to the second image at the user interface, displaying the second subregion of the second image within the user interface.

For example, the computer system can: retrieve a first digital photographic image-recorded by a first optical inspection station at a first position along an assembly line—of the first assembly unit from a database; normalize the first digital photographic image to form the first image, as described above; retrieve a second digital photographic image-recorded by a second optical inspection station at a second position along the assembly—of the first assembly unit; and normalize the second digital photographic image to form the second image. The computer system can then implement methods and techniques described above to define analogous subregions of the first and second images (and other images of the first assembly unit) and to sequentially display these subregions as the user indexes through these images.

In particular, in this variation, the computer system can implement methods and techniques described above to display expanded views of the same physical position of a single assembly unit from a sequence of images recorded at various stages of the assembly unit's assembly. By aligning images of one assembly unit at different stages of assembly by a common feature and sequentially displaying these images in the user interface responsive to scroll or index inputs entered by the user, the computer system can enable the user to view changes to the assembly unit over time (e.g., along the assembly line) with a view window of these separate images locked to a common reference feature contained in these images.

17. Feature Selection

Generally, the computer system interfaces with the user through the user interface to receive a selection of a particular feature or set of features from which the computer system subsequently extracts a dimension.

17.1 Feature Space and Vector-Based Selection

In one implementation, the computer system: implements computer vision techniques to identify features of the first assembly unit represented in the first image; generates a feature space containing vectorized points, lines, curves, areas, and/or planes representing these features; and overlays the first image with this feature space, as described above. In particular, when an image of a unit captured by an optical inspection station is selected by a user for insertion of a measurement, the computer system can implement machine vision techniques to automatically detect features of the assembly unit shown in the first image. For example, the computer system can implement edge detection techniques to identify corners (e.g., points), edges (e.g., lines, curves), and surfaces (e.g., areas, planes) in the first image. To guide the user in selecting one or more features in the first image for measurement, the computer system can: generate the feature space-specific to the first image—that contains vectorized points, curves, areas, and/or planes aligned to points, lines, and surfaces detected in the first image; and then render the first image and the feature space laid over the first image in the user interface. The computer system can then receive manual selection of a particular vector (or a set of vectors) from the first set of vectors contained in the first feature space from the user via the user interface and then identify the particular feature (or set of features) corresponding to the particular vector(s) selected by the user.

17.2 Pixel-Based Feature Selection

Alternatively, the computer system can interface with the user interface to receive selection of a pixel from the first image and to implement methods and techniques described above to select a particular feature—from a set of features—in the first image nearest or otherwise corresponding to this pixel. For example: while viewing the first image within the user interface, the user can navigate a cursor to a pixel near a desired corner feature, near a desired edge feature, or on a desired surface and select this pixel; as described above, the computer system can then compare this pixel selection to a feature space specific to the first image to identify a particular feature nearest the selected pixel.

As described above, the computer system can also prompt the user to select multiple pixels nearest a desired corner, along a desired edge, or on a desired surface represented in the first image; the computer system can then compare these selected pixels to the feature space to select a corner, line (or curve), or area that best fits the set of selected pixels. However, the computer system can interface with the user through the user interface in any other way to receive a selection of a particular feature from the first image. The computer system can implement similar methods and techniques to receive selections of multiple distinct features from the first image, as described below.

The computer system can define a measure specification for the set of images based on this feature(s), to extract a real dimension of this feature from the images, and to populate this measurement specification across other images in the set.

18. Measure Specification

Generally, the computer system generates a measurement specification defining a measurement type for the feature(s) selected and characterizing the particular feature(s) selected from the first image.

As described above, the computer system can receive selection of one or more vectorized curves in the feature space from the user. For example, from vectorized curves contained in the feature space overlaid on the first image, the user can select a vectorized point, an intersection of two vectorized curves, a single vectorized curve, two non-intersecting vectorized curves, or an area enclosed by one or more vectorized curves. The computer system can populate a measurement type menu within the user interface with various measurement types, such as distance (e.g., corner-to-corner), length (e.g., end-to-end or edge length), radius (or diameter), planarity, parallelism, circularity, straightness, line profile, surface profile, perpendicularity, angle, symmetry, concentricity, and/or any other measurement type for the particular feature(s) in the first image; the user can then select a measurement type for the selected points, intersections, curves, and/or areas in the feature space from this menu.

Based on the type(s) of features selected by the user, the computer system can also filter, order, and/or suggest a measurement type in a set of supported measurement types. For example, upon selection of a single line (e.g., a substantially straight curve), the computer system can predict a length-type measurement and can enable a length-type measurement type in the menu of measurement types accordingly. Upon selection of an arc, the computer system can enable a total arc length measurement, a radius measurement, and a diameter measurement in the menu of measurement types. Upon selection of an area, the computer system can enable a total area measurement and a circumference measurement in the menu of measurement types. Upon selection of a point and a curve, the computer system can enable a nearest distance measurement and an orthogonal distance measurement in the menu of measurement types. Upon selection of a first curve and a second curve, the computer system can enable a nearest distance measurement, an angle measurement, and a gap profile measurement (e.g., a gap distance as a function of length along the first and second curves) in the menu of measurement types. Upon selection of three points, the computer system can enable a measurement for calculating a smallest circle formed by the three points in the menu of measurement types. However, the computer system can support any other predefined or user-defined (e.g., custom) measurement type. The computer system can also receive a selection for a measurement type or automatically predict a measurement type for the particular feature(s) in any other way.

From the particular feature(s) (e.g., an original feature in the first image or a vectorized point, curve, and/or area, etc. in the feature space specific to the first image) selected from the first image, the computer system can generate a measurement specification for the set of images. For example, the computer system can define a feature window containing the particular feature in the first image and store this position and geometry of the feature window (e.g., relative to an origin of the first image or relative to the upper-left corner of the first image) in the measurement specification. The computer system can project this feature window onto other images to identify features-analogous to the particular feature selected from the first image—in these other images in the set. In particular, when processing the set of images according to the measurement specification, the computer system can project the feature window onto each image in the set and can then scan regions of these images bound by the feature window for features analogous to the feature(s) selected. In this implementation, the computer system can implement methods and techniques described above in the second method S200 to align the feature window defined at the first image to other images in the set.

The computer system can also characterize the particular feature and store this characterization in the measurement specification. For example, the computer system can: implement template matching or pattern recognition techniques to characterize the particular feature as one of an arc, spline, circle, or straight line; write this characterization of the particular feature to the measurement specification; and apply this characterization to other images in the set to identify features of the same type in these other images. The computer system can also: calculate a real or pixel-based dimension of the particular feature; store this dimension in the measurement specification; and detect analogous features—in the remaining images in the set—that exhibit similar real or pixel based dimensions, such as within a tolerance of ±2%. Similarly, the computer system can: prompt the user to enter a nominal dimension and a dimensional tolerance for the nominal dimension for the particular feature(s); or extract the nominal dimension and dimensional tolerance from a CAD model of the first assembly unit, as described below; and identify features in other images in the set that are analogous to the particular feature based on the nominal dimension of the feature.

The computer system can also prompt the user to enter a name of the measurement (e.g., "antenna_height_1"), a description of the measurement (e.g., "antenna height"), tags or search terms for the measurement (e.g., "John_Smiths_measurement_set," "RF group," "DVT" or "EVT", etc.), and/or other textual or numerical data for the measurement. The computer system can then store these data in the measurement specification. For example, the computer system can enable the user to toggle such tags within the user interface to access and filter points represented in a graph or chart of real dimensions of analogous features read from images in the set according to the measurement specification. Similarly, the computer system can enable another user to search for this measurement specification by entering one or more of these tags or other terms through a search window in another instance of the user interface in order to access this measurement specification for this set of images or to access this measurement specification for application across another set of images. The computer system can therefore enable multiple users: to apply general, group-specific, and/or user-specific measurement specifications across various sets of images; to access data extracted from a set of images according to a general, group-specific, and/or user-specific measurement specification; and to access measurement specifications configured by other users.

However, the computer system can collect any other related information from the user or extract any other relevant data from the first image to generate a measurement specification for the set of images in. The computer system can then apply the measurement specification across images in the set of images to identify analogous features in assembly units represented in these images and to extract real dimensions of these analogous features directly from these images.

19. Analogous Feature Detection

Generally, the computer system: scans an image in the set of images for a feature analogous to the particular feature selected from the first image, such as a feature located in a similar position and exhibiting a similar geometry (e.g., real or pixel-based dimension, feature type) as the particular feature selected from the first image, such as by implementing methods and techniques described above in the second method S200; and repeats this process for remaining images in the set to identify a corpus of analogous features in assembly units represented across the set of images. The computer system can then extract real dimensions of these features directly from these images and assemble these dimensions into a graph, chart, or statistic representing dimensional variations of like features (e.g., lengths, width, radii of parts; relative positions of parts; gaps between parts; etc.) across this set of assembly units.

To calculate real dimensions of analogous features across a set of images of assembly units at the same or similar assembly stage in one or more builds according to a single measurement specification configured by the user, the computer system can scan each image in the set of images for a feature analogous (e.g., substantially similar, equivalent, corresponding) to the feature selected by the user and specified in the measurement specification. For example, for each image selected for calculation of a real dimension according to the measurement specification, the computer system can implement methods and techniques described above to detect features in an image and then select a feature in the image that best matches the relative size, geometry, position (e.g., relative to other features represented in the image), color, surface finish, etc. of the particular feature selected from the first image and specified in the measurement specification. The computer system can then calculate a dimension of the analogous feature for each image in the set, as described below.

19.1 Window Scan

In one implementation, the computer system: defines a feature window encompassing the particular feature, offset from the particular feature, and located according to an origin of the first image; and stores the feature window in the measurement specification, as described above. For example, the computer system can define the feature window relative to a global origin of the image (e.g., an upper-left corner of the first image). Alternatively, the computer system can implement computer vision techniques to detect the perimeter of the first assembly unit in the first image, define an origin on the first assembly unit in the first image (e.g., at an upper-left corner of the first assembly unit), and define a location of the feature window relative to the assembly-unit-based origin. The computer system can also implement a preset offset distance (e.g., 50 pixels) and define the geometry of the future window that encompasses the particular feature and is offset from the particular feature by the preset offset distance. For example, for the particular feature that defines a corner, the computer system can define a circular feature window 100 pixels in diameter; for the particular feature that defines a linear edge, the computer system can define a rounded rectangular feature window 100 pixels wide with corners exhibiting 50 pixels in radius and offset from near ends of the linear edge by 50 pixels.

The computer system can then locate the feature window within an image according to a global origin of the image (e.g., an upper-left corner of the image). Alternatively, the computer system can repeat the process described above to define an assembly-unit-based origin within the image and to locate the feature window in the image according to this assembly-unit-based origin. The computer system can then: scan a region of the image bound by the feature window to identify a limited set of features in the image; and compare geometries and sizes of features in this limited set of features to the characterization of the particular feature stored in the measurement specification to identifying one feature in the image best approximating (e.g., "analogous to") the particular feature from the first image. The computer system can repeat this process for each remaining image in the set of images.

19.2 Feature Matching in Feature Spaces

In another implementation, the computer system generates a first feature space for the first image, labels a particular vector representing the particular feature in the first feature space, and stores the first feature space in the measurement specification. The computer system can then implement similar methods and techniques to identify a set of features in an image in the set of images and to generate a feature space containing a set of vectors representing this set of features in the image. The computer system can then: align the feature space of the image to the first feature space of the first image; identify a vector in the set of vectors nearest the particular vector in the first set of vectors in location and geometry; and label the feature in the image corresponding to the vector as analogous to the particular feature in the first image. The computer system can repeat this process for each remaining image in the set of images.

However, the computer system can implement any other method or technique to identify like features—of assembly units represented in the set of images—that are analogous to the particular feature of the first assembly unit selected from the first image. Furthermore, the computer system can repeat the foregoing processes for each of multiple distance features selected from the first image.

19.3 Feature Confirmation

In one variation, the computer system implements methods and techniques described above to receive confirmation from the user that its identification of a second feature—in a second image in the set of images—is analogous to the particular feature selected from the first image before repeating this process to identify analogous features in other images in the set. For example, once the measurement specification is defined, the computer system can: execute a feature selection routine to identify a second feature in the second image predicted to be comparable (i.e., analogous) to the particular feature selected from the first image; and store steps of this feature selection routine or a characterization of the feature selection routine in memory (e.g., in the measurement specification). Before repeating the feature selection routine for other images in the set, the computer system can: display the second image within the user interface; indicate the second feature within the second image; and prompt the user-through the user interface—to confirm that the second feature is analogous to the particular feature. If the user indicates that the second feature is incorrect, the computer system can repeat the feature selection routine to select an alternate feature from the second image and repeat this process until the user indicates that the correct feature was selected. The computer system can additionally or alternatively prompt the user to manually indicate the correct feature in the second image, and the computer system can update the feature selection routine accordingly. However, in response to receipt of manual confirmation of the second feature as analogous to the particular feature from the user via the user interface, the computer system can: execute the feature selection routine at a third image in the set to identify a third feature-analogous to the particular feature—in the third image; and execute the feature selection routine at other images in the set to identify analogous features in these other images.

20. Measurement Propagation

Generally, once like features are identified in each image in the set of images, the computer system extracts dimensions of each of these features directly from their corresponding images.

Furthermore, once a dimension of a feature is extracted from an image of an assembly unit, the computer system can render an indication of the feature and its dimension within the user interface, such as over the image or adjacent the images. In particular, in response to selection of a first feature from a first image at the user interface, the computer system can display a first real dimension of the first feature with (e.g., on or adjacent) the first image within the user interface; in response to selection of a second image of a second assembly unit at the user interface, the computer system can display both the second image and a second real dimension of a second feature-analogous to the first feature-within the user interface; etc.

20.1 Real Dimension from Original Image

In one variation, the computer system: projects a dimension space onto the first ("flattened") image; extracts the first real dimension of the particular feature from the first image based on a position of the particular feature relative to the dimension space and the measurement type; and repeats this process for other images in the set.

In this implementation, the computer system can flatten an original digital photographic image of the first assembly unit and present the flattened first image to the user through the user interface for selection of the particular feature. Once the particular feature is selected, the computer system can project the particular feature from the flattened first image onto the first digital photographic image to identify the particular feature in the original digital photographic image. The computer system can then map a distorted measurement space onto the first digital photographic image in preparation for extracting a real dimension of the particular feature from the digital photographic image. Generally, in this variation, in order to precisely (i.e., accurately and repeatably) calculate a real dimension of a feature of an assembly unit represented in a flattened image, the computer system can project a distorted measurement space onto the corresponding digital photographic image and extract a dimension of the feature from the digital photographic image based on a position of the feature relative to the distorted measurement space. In particular, rather than extract a real dimension from a flattened image, which may result in loss of data over the original digital photographic image, the computer system can map a distorted measurement space onto the corresponding digital photographic image in order to compensate for optical distortion (e.g., perspective distortion) in the digital photographic image while also preserving data contained in the image.

In one implementation, the computer system generates a virtual measurement space representing a plane in real space at a particular distance from a camera in the optical inspection station that recoded the digital photographic image but "warped" (i.e., "distorted") in two or three dimensions to represent optical distortion in the digital photographic image resulting from optics in the camera. In one example, after capturing a digital photographic image of an assembly unit, an optical inspection station can tag the digital photographic image with a zoom level, focus position, aperture, ISO, and/or other imaging parameters implemented by the optical inspection station at the instant the digital photographic image was recorded. In this example, to calculate a dimension of a feature in the digital photographic image, the computer system can: extract these imaging parameters from metadata stored within the digital photographic image; calculate a reference plane on which the real feature of the assembly unit occurs in real space relative to the real reference (e.g., a fiducial on the optical inspection station); and then generate a virtual measurement space containing a set of X and Y grid curves offset by a virtual distance corresponding to a known real distance on the real reference plane based on the imaging parameters stored with the digital photographic image. The computer system can then calculate the length, width, radius, etc. of the feature shown in the digital photographic image by interpolating between X and Y grid curves in the virtual measurement space overlaid on the digital photographic image.

In the foregoing example, the computer system can select a pixel or a cluster of pixels at each end of a feature-analogous to the particular feature—in the digital photographic image, project the pixels onto the warped measurement layer, interpolate the real position of each projected pixel or pixel cluster based on its position relative to X and Y grid curves in the measurement space, and then calculate the real length of the feature (or distance between two features) in the real unit based on the difference between the interpolated real positions of the pixels or a cluster of pixels. In this example, the computer system can select a pixel or a cluster of pixels at each end of a feature—corresponding to a feature defined in the measurement specification—in the digital photographic image, generate a virtual curve-representing a real straight line in the measurement space and passing through the pixels or a cluster of pixels, and then calculate a straightness of the feature in the assembly unit from variations between pixels corresponding to the feature in the digital photographic image and the virtual curve in the measurement space. The computer system can therefore generate a warped measurement layer from a standard calibration grid, based on calibration fiducials in a digital photographic image, or based on any other generic, optical inspection station-specific imaging, or digital photographic image-specific parameter.

However, the computer system can generate a measurement layer (or multi-dimensional measurement space) of any other form and can apply this measurement layer to a digital photographic image in any other way to calculate a real dimension of a feature on the assembly unit according to parameters defined in the measurement specification. The computer system can also render a virtual form of the measurement layer, such as in the form of a warped grid overlay, over a corresponding digital photographic image when rendered with the user interface.

20.2 Real Dimension from Dewarped Image

In another implementation, the computer system extracts real dimensions directly from flattened images (described above). For example, when calculating an homography transform for flattening digital photographic images recorded at an optical inspection station, such as based on a reference image recorded at the optical inspection station, the computer system can calculate a scalar coefficient that relates a length of a digital pixel in a flattened image to a real dimension (i.e., a length value in real space), as described above. To extract a real dimension of a feature from an image, the computer system can: count a number of pixels spanning the feature; and multiply this number of pixels by the scalar coefficient to calculate a real dimension of this feature. However, the computer system can implement any other methods or techniques to extract a real dimension of a real feature on an assembly unit from a flattened image of the assembly unit. The computer system can implement these methods and techniques for each image in the set of images to calculate real dimensions of like features across the set.

(The computer system can additionally or alternatively implement methods and techniques described herein to calculate a dimension of an assembly unit solely in one image of an assembly unit based on a measurement specification (e.g., rather than propagate the measurement specification across all or a subset of images). For example, the computer system can implement these methods and techniques to calculate a one-time measurement based on a pixel-to-pixel selection entered by a user onto a single image.)

21. Autonomous Measure

Generally, the computer system can: receive selection of a reference image—by a user interfacing with the computer system-depicting a particular feature (e.g., camera lens, PCB gap) of an unknown dimension (e.g., length, arc length, radius); receive selection of a measurement type from the user to extract the unknown dimension from the particular feature depicted in the reference image; generate a prompt requesting the user to generate a measurement model for extracting this unknown dimension of the particular feature from other images different from the reference image; and serve this prompt to the user. In particular, the computer system can, responsive to receiving selection of the measurement type: map a first set of reference points about the particular feature depicted in the reference image according to the measurement type; and extract the real dimension for the particular feature based on the first set of reference points on the reference image. The computer system can then, responsive to receiving selection from the user to generate the measurement model: display a set of images-depicting the particular feature—to the user, such as at an interactive display at the computer system; and for each image, in the set of images, record selection of calibration points within a calibration container at the image according to the set of reference points in the reference image.

Thus, the computer system can: generate the measurement model for extracting the real dimension of the particular feature based on the calibration container and the real dimension for the particular feature extracted from the reference image; and propagate this model to other images depicting the particular feature, such as images of the assembly unit type previously recorded at the optical inspection station and/or future images of the assembly unit type to be recorded at the optical inspection station and/or images currently being recorded—in real time—at the optical inspection station.

21.1 Reference Image

Blocks of the method S100 recite: accessing a first set of images recorded at an optical inspection station and corresponding to a set of assembly units of a particular assembly unit type; and receiving selection of a reference image, in the first set of images, depicting a particular feature of the particular assembly unit. Generally, the computer system can: retrieve a set of images of a particular assembly unit type recorded at an optical inspection station, such as previously recorded images and/or images currently being recorded at the optical inspection station; display this set of images to a user interfacing with the computer system, such as at an interactive display at the computer system; and receive selection of a reference image from the set of images depicting a particular feature of an unknown (e.g., desired to be known by the user) real dimension.

In one implementation, the computer system can: access a set of images of a particular assembly unit type recorded over a first time period at the optical inspection station; scan the set of images to identify a subset of images that contain an image resolution score above an image resolution score threshold (e.g., remove blurry and obscure images); display this subset of images to a user interacting with the computer system; and receive selection of a reference image in the subset of images depicting a particular feature of an unknown real dimension desired to be known by the user interacting with the computer system. For example, the computer system can receive selection of a reference image in the set of images depicting a camera lens and/or a PCB gap of an unknown dimension desired to be known by the user.

In another implementation, the computer system can: access a set of images of a particular assembly unit type recorded over a first time period at the optical inspection station; receive selection—by the user interacting with the computer system—of a particular feature desired for measurement across a set of images; and scan each image, in the set of images, to identify presence of the particular feature in the image. In this implementation, the computer system can then: identify a subset of images, in the set of images, containing presence of the particular feature; display this subset of images (e.g., via a feature window at an interactive display encompassing the particular feature) to the user; and receive selection of a reference image from this subset of images by the user that depicts the particular feature. Alternatively, the computer system can: generate a ranked list of this subset of images, such as based on an image resolution score for each image in the subset of images; and autonomously retrieve the highest ranked image in the ranked list as the reference image for the calibration routine.

Therefore, the computer system can: access a set of images depicting a set of assembly units of a particular assembly unit type and recorded at optical inspection station over a particular time period; manually and/or autonomously retrieve a reference image from this set of images; and implement this reference image during a calibration routine for generating a measurement model that automatically extracts a real dimension of a particular feature across other images depicting the particular assembly unit type.

21.2 Mapping Reference Points

Blocks of the method S100 recite: receiving selection of a measurement type for the particular feature in the reference image; mapping a first set of reference points at the particular feature in the reference image according the measurement type; and extracting a first real dimension for the particular feature based on the first set of reference points. Generally, the computer system can: retrieve a reference point map (e.g., linear reference map, circular reference map) including a set of reference points according to the measurement type; manually and/or autonomously map the set of reference points about the particular feature depicted in the reference image; and extract a real dimension of the particular feature based on the set of reference points in the reference image. In particular, the computer system can: receive manual selection by a user of the set of reference points at the reference image, such as at a feature window presented at an interactive display at the computer system; and/or autonomously scan a region of the reference image containing the particular feature to identify the particular feature in the reference image.

Thus, the computer system can: implement this reference image containing the set of reference points during a calibration routine in generating the measurement model for the particular feature; and locate a feature window relative the set of reference points about the particular feature in other images based on the reference image.

21.2.1 Mapping: Manual Mapping

In one implementation, the computer system can: receive selection of measurement type (e.g., point to point measurement, arc length measurement, concentricity measurement) for the particular feature depicted in the reference image; retrieve a reference point map (e.g., two-point map, three-point map) according to the measurement type; generate a prompt for a user to select a set of reference points associated with the reference point map about the particular feature depicted in the reference image; and receive selection of each reference point, in the set of reference points, form the user at the reference image about the particular feature. The computer system can then, responsive to receiving selection of each reference point in the reference image: extract a real dimension of the particular feature based on the set of reference points in the reference image; and receive selection from the user confirming that the real dimension in the reference image corresponds to a target real dimension for the particular feature.

In one example, the computer system can: retrieve a reference image depicting a particular feature of an unknown real dimension corresponding to a camera lens; receive selection of a measurement type corresponding to a circumference measurement type for measuring a circumference of the camera lens displayed in the reference image; access a three-point reference map including a set of reference points according to the circumference measurement type; and generate a prompt for a user to select the set of reference points about the camera lens in the reference image. The computer system can then: receive selection of each point, in the set of reference points, about the camera lens depicted in the reference image by the user interfacing with the computer system; and extract a real dimension corresponding to a circumference dimension of the camera lens based on the set of reference points about the camera lens in the reference image.

Therefore, the computer system can: receive manual mapping of a set of reference points to a reference image depicting a particular feature; and implement this reference image containing the set of reference points during a calibration routine in generating the measurement model for the particular feature.

21.2.2 Mapping: Auto Geometry Mapping

In one implementation, the computer system can: retrieve a reference image recorded at the optical inspection station and depicting an assembly unit of a particular assembly unit type; extract a set of visual features from the reference image; interpret real dimensions (e.g., gap lengths, arc lengths) for a subset of visual features, in the set of visual features, based on previously generated measurement models for this subset of visual features; and aggregate these real dimensions into a dimension container for the reference image. The computer system can then: present the real dimensions of this subset of visual features to the user, such as at an interactive display at the computer system; receive selection from the user of a real dimension in the dimension container corresponding to a particular feature in the subset of visual features. The computer system can thus, responsive to receiving selection of the real dimension corresponding to a particular feature: locate a feature window about the particular feature in the reference image; map a first set of reference points about the particular feature in the reference image according to the real dimension extracted for the particular feature; and generate a prompt for a user to initialize a calibration routine in order to generate a measurement model corresponding to the particular feature.

In one example, the computer system can: retrieve a reference image recorded at the optical inspection station and depicting an assembly unit of a particular assembly unit type; receive selection—by the user—of a bounding box about a first region on the reference image encompassing a set of visual features; extract a set of visual features (e.g., camera lens, PCB gaps) from this first region in the reference image; and autonomously extract real dimensions for this set of visual features, such as extracting a circumference dimension for the camera lens and/or a length dimension for the PCB gap. In this example, the computer system can then: receive selection of an extracted real dimension from the user, such as a selection of the circumference dimension for the camera lens; map a set of reference points about the camera lens corresponding to a circumference measurement type; and generate a prompt for the user to generate a measurement model corresponding to autonomous measurement of a circumference dimension for the camera lens on other images retrieved from the optical inspection station.

Therefore, the computer system can: autonomously map a set of reference points to a reference image depicting a particular feature; and implement this reference image containing the set of reference points during a calibration routine in generating the measurement model for the particular feature.

Additionally or alternatively, the computer system can retrieve a CAD model representing the particular feature selected for dimension extraction, such as a previously generated CAD model defining the particular feature, a real dimension for the particular feature, and a set of reference points encompassing the particular feature in the CAD model. The computer system can then: scan the reference image to identify the particular feature in the reference image; map a set of reference points about the particular feature in the reference image according to the CAD model; and extract a real dimension for the particular feature according to the set of reference points in the reference image.

21.3 Calibration Routine+Generating Measurement Model

Blocks of the method S100 recite: initializing a calibration container for the measurement type; locating a feature window encompassing the particular feature, offset from the particular feature, and located relative to the first set of reference points in the reference image; receiving selection of a calibration point in the feature window corresponding to a reference point in the first set of reference points; and recording the calibration point in the calibration container. Generally, the computer system, can: receive selection from the user to initialize a calibration routine in order to generate a measurement model corresponding to a measurement type for a particular feature in the reference image; retrieve a set of images from the optical inspection station depicting the particular feature analogous to the particular feature depicted in the reference image; display this set of images to the user, such as at an interactive display at the computer system; and, for each image (e.g., 30 to 50 images), in the set of images, receive selection—from the user—of a calibration point in the image according to the set of reference points depicted in the reference image.

Thus, the computer system can then: record the set of calibration points within a calibration container associated with the measurement type for the particular feature; and subsequently generate the measurement model for the particular feature based on this calibration container.

In one implementation, the computer system can, for a first image in the set of images: locate a feature window about the particular feature identified in the image and positioned relative to a reference point in the set of reference points about the particular feature in the reference image; display the feature window to the user; prompt the user to select a calibration point in the feature window that corresponds to a reference point depicted in the reference image; and record the calibration point within a calibration container including a set of calibration points associated with the set of reference points depicted in the reference image. The computer system can thus, repeat this process for each image in the set of images (e.g., 30 total images) to populate the calibration container with a target set of calibration points (e.g., 30 calibration points for each reference point depicted in the reference image). In this implementation, the computer system can: receive selection of a single calibration point for each image displayed to the user and/or receive selection of multiple calibration points for the image; and/or receive selection from the user to display the next image (or "skip") in the set of images (e.g., currently displayed image is blurry). Accordingly, the computer system can define: a minimum set of calibration points for the calibration container in order to subsequently generate the measurement model for the particular feature; and/or update the calibration container to include new calibration points; and/or modify existing calibration points in the calibration container. In this implementation, additional calibration points in the calibration container will result in greater accuracy for the extracted real dimensions of the measurement model.

For example, the computer system can: retrieve a reference image depicting a particular feature corresponding to a camera lens for a particular assembly unit; and access a set of images recorded at an optical inspection station that depict the camera lens. The computer system can then, for each image in the set of images: locate a feature window encompassing the camera lens and positioned relative a reference point about the particular feature depicted in the reference image; prompt the user to select a calibration point about the camera lens depicted in the feature window corresponding the reference point depicted in the reference image, such as selecting a calibration point that corresponds to a first reference point in a three-point circumference map about the camera lens in the reference image; and record the calibration point in a calibration container. The computer system can thus: repeat this process until a minimum set of calibration points are recorded in the calibration container; and generate the measurement model for extracting the real dimension of the particular feature based on this calibration container.

Therefore, the computer system can: autonomously and/or manually select calibration points across a set of images depicting a particular feature of a particular assembly unit type; and record these calibration points within a calibration container to achieve greater accuracy for a generated measurement model corresponding to a particular feature for a particular assembly unit type.

Blocks of the method S100 recite generating a measurement model for the particular feature based on the first real dimension in the reference image and the calibration container. Generally, the computer system can, responsive completion of the calibration routine-such as achieving a minimum set of calibration points in the calibration container-generate the measurement model for extracting a real dimension of the particular feature based on the calibration container and the real dimension extracted for the particular feature in the reference image. In one implementation, the computer system can: retrieve a particular image of a particular assembly unit type recorded at an optical inspection station; and access a measurement model corresponding to a measurement type of a particular feature. The computer system can subsequently: extract a set of visual features from the particular image; identify presence of the particular feature, in the set of visual features, at a particular location in the first image; autonomously locate a set of reference points about the particular feature in the first image according to the measurement model; and extract a real dimension (e.g., gap length, circumference) of the particular feature in the first image based on the set of reference points. Thus, the computer system can: autonomously and/or manually generate the measurement model for extracting a real dimension corresponding to a particular feature for a particular assembly unit type; and implement (or "propagate") this measurement model across other images of the particular assembly unit type recorded at the optical inspection station.

22. Autonomous Measurement Model Propagation

Blocks of the method S100 recite accessing a second set of images, different from the first set of images, recorded at the optical inspection station and corresponding to a second set of assembly units of the particular assembly type. Blocks of the method S100 also recite, for each image in the second set of images: initializing a dimension container for the measurement type; identifying the particular feature in the image; extracting a real dimension of the particular feature from the image based on the measurement model for the particular feature; and storing the real dimension in the dimension container. Generally, the computer system can propagate the measurement model across: a set of images previously recorded at the optical inspection station for the particular assembly unit type; a set of images currently recording (or "in real-time") at the optical inspection station for the particular assembly unit type; and/or a future set of images that will be recorded at the optical inspection station.

In one implementation, the computer system can: retrieve a measurement model for extracting a real dimension of a particular feature of a particular assembly unit type; and receive selection to propagate this measurement model across a set of images previously recorded at the optical inspection station for the particular assembly unit type. The computer system can then: access this set of images previously recorded at the optical inspection station depicting the particular feature of the particular assembly unit type; extract a real dimension for this particular feature from each image, in the set of images, based on the measurement model for the particular feature; and store this real dimension in a dimension container representing extracted real dimensions for the particular feature across the set of images.

Therefore, the computer system can: aggregate the real dimensions for the particular feature extracted across a set of images; and present these dimensions for review by a remote viewer, such as by presenting these real dimensions in a chart and/or graph at an interactive display.

22.1 Measurement Model Confidence Score

Blocks of the method S100 recite: interpreting a model confidence score for the measurement model based on deviations of real dimensions in the dimension container from a target real dimension for the particular feature; and, in response to the model confidence score falling below a confidence score threshold, flagging the measurement model for calibration. Generally, the computer system can implement standard deviation and regression techniques (e.g., regression formula) to predict uncertainty of a real dimension for a particular feature extracted from an image based on the measurement model.

In one implementation, the computer system can interpret a model confidence score that falls below the target model confidence score (e.g., real dimensions extracted from images based on the measurement model are inaccurate). In this implementation, the computer system can thus: terminate propagation of the measurement model across an assigned set of images; flag the measurement model for additional calibration by a remote viewer; generate a notification to the remote viewer indicating that the measurement model is in need of additional calibration to continue measurement model propagation across the assigned set of images; and serve this notification to the remote viewer, such as at an interactive display at the computer system. Additionally, the computer system can, upon review of the flagged measurement model by the user: receive selection from the remote viewer to initiate a second calibration routine for the measurement model of the particular feature; during the calibration routine, receive additional calibration points across a set of images corresponding to the set of reference points in the reference image; update a calibration container associated with the measurement model based on the additional calibration points, such as adding additional calibration points in the calibration container and/or modifying existing calibration points within the calibration container; and generate a second measurement model for the particular feature based on the calibration container. The computer system can then propagate this second measurement model across the set of images for extracting the real dimension for the particular feature.

22.2 Real Dimension Confidence Score

In another implementation, the computer system can: calculate a dimension confidence score for a particular real dimension extracted from a particular image within a set of images, such as based on a positional resolution of the particular feature in the particular image; and, in response to the dimension confidence score falling below a target dimension confidence score flag for manual review by a remote viewer. For example, the computer system can: extract a real dimension of the particular feature at a particular location in a first image based on the measurement model; and identify the particular location of the particular feature in the first image deviating from a reference position of the particular feature in the reference image. Therefore, the computer system can: calculate a dimension confidence score falling below a target confidence score for the real dimension; and flag the image for manual review by a remote operator.

22.3 Correlations+Measurement Model

As described above, the computer system can: calculate correlations between non-visual manufacturing features, visual manufacturing features extracted from a particular image, and a defect identified for a particular assembly unit type; and isolate a particular visual feature in response to a correlation associated with the particular visual feature exceeding a threshold correlation. In one implementation, the computer system can: retrieve a measurement model for extracting real dimensions of the particular feature and/or retrieve measurement models for extracting real dimensions of other visual features proximal the particular feature; and extract real dimensions for the particular feature and visual features proximal the particular feature based on these retrieved measurement models. The computer system can thus: store these real dimensions within a dimension container; and flag a real dimension in the dimension container that deviate from a target real dimension for manual review by a remote viewer.

23. Dimension Library

Block S110 of the method S100 recites accessing a dimension library containing a set of feature templates associated with geometric characteristics of predefined features in recorded inspection images of assembly units. Generally, the computer system can: retrieve a dimension library, such as from a database from a remote computer system, containing a set of feature templates associated with geometric characteristics (e.g., straightness, flatness, circularity, angularity, parallelism) of previously-confirmed features by a user; and implement the set of feature templates contained in the dimension library to identify these previously-confirmed features across a set of inspection images—of a set of assembly units-recorded during production of the set of assembly units.

More specifically, the computer system can: access an inspection image of an assembly unit recorded at the optical inspection station; as described above, identify a visual feature in the inspection image; and identify a feature template—in the set of feature templates contained in the dimension library—as corresponding to the visual feature based on geometric characteristics (e.g., straightness, profile) of the feature template approximating (e.g., 99% similarity) geometric characteristics of the visual feature in the inspection image. The computer system can then: based on differences between the feature template and the visual features, identify the visual feature as a key feature (or "feature of interest") in the inspection image; and extract a real dimension (i.e., a measurement) for the key feature according to the feature template associated with the visual feature.

Thus, the computer system can: extract a set of visual features from the inspection image; based on the set of feature templates, contained in the dimension library, identify a subset of visual features—in the set of visual features—as corresponding to a previously-confirmed feature by the user; and extract a set of real dimensions of the subset of visual features from the inspection image.

23.1 Generating Dimension Library

In one implementation, the computer system can access a set of inspection images of a set of assembly units previously selected for inspection by a user at a user portal. The computer system can then, for each inspection image, in the set of inspection images: identify a visual feature (e.g., edges, corners, profiles) previously confirmed by a user as a key feature (or "feature of interest") in the inspection image; generate a feature template based on geometric characteristics of the visual features in the inspection image; and aggregate the feature template in a set of feature templates. Accordingly, the computer system can then: initialize a dimension library such as within internal memory at the computer system; and store the set of feature templates in the dimension library. Alternatively, the computer system can: retrieve a dimension library from internal memory of the computer system; and update the dimension library to include the set of feature templates generated from the set of inspection images.

In one example, the computer system can: receive a selection to view an inspection image of an assembly unit from a user at a user portal; receive selection of a first visual feature corresponding to a circularity feature in the inspection image; map a set of reference points about the circularity feature in the inspection images; extract a real dimension (e.g., circumference measurement) of the circularity feature based on the set of reference points mapped onto the circularity feature; and, in response to receiving confirmation of the circularity feature from the user at the user portal, store the set of reference points as a feature template corresponding to the circularity feature. Therefore, the computer system can then: repeat this process across a set of inspection images selected for review by the user to generate a set of feature templates; and store the set of feature templates into a dimension library within internal memory of the computer system.

24. Predicting Key Features: First Image

Blocks S120, S122, and S130 of the method S100 recite: predicting a first set of key features in the first inspection image based on the set of feature templates contained in the dimension library; extracting a first set of real dimensions of the first set of key features from the first inspection image; and projecting the first set of real dimensions proximal the first set of key features onto the first inspection image at the user portal. Generally, the computer system can: prior to presentation of an inspection image to a user, predict a set of key features (or "features of interest") in an inspection image; extract a set of real dimensions (e.g., measurements of distance, measurements of circumference) of the set of key features in the inspection image; and, upon receiving the selection to view the inspection image by the user, automatically present the inspection image and the set of real dimensions of the set of key features to the user. Thus, the computer system can present real dimensions of key features in an inspection image to the user without receiving manual selection of features in the inspection images from the user.

In one implementation, the computer system can: access the dimension library containing a set of feature templates associated with geometric characteristics (straightness, circularity) of previously-confirmed features (e.g., edges, corners, circles) by the user; access an inspection image of an assembly unit, such as recorded by an optical inspection station during production of the assembly unit; prior to presentation of the inspection image to a user, leverage the dimension library to predict a set of key features (or "features of interest") in the inspection images based on geometric characteristics of feature templates contained in the dimension library; and extract a set of real dimensions (e.g., distance measurements, circumference measurements, angle measurements) of the set of key features from the inspection image. The computer system can then: present the inspection image to the user, such as at a user portal executing on a computing device (e.g., tablet) associated with the user; and project the set of real dimensions proximal (e.g., within 10 millimeters) the set of key features onto the inspection image at the user portal. Therefore, the computer system can: prior to presentation of an inspection image by user, predict key features (or "features of interest") relevant to the user in the inspection image; and automatically present real dimensions for these key features to the user upon selection of the inspection image by the user.

In one implementation, prior to presentation of the inspection image to the user, the computer system can: access a limit (e.g., twenty) on a quantity of key features contained in a set of key features corresponding to the inspection image; and extract a set of visual features (e.g., global features) from the inspection image. The computer system can then, for each visual feature, in the set of visual features: identify a feature template, in the set of feature templates contained in the dimension library, associated with the visual feature; generate a similarity score (e.g., 99% similarity) between the visual feature and the feature template; and, in response to the similarity score exceeding a threshold similarity score (e.g., 95% similarity score), aggregate the visual feature into an initial set of key features in the inspection image.

For example, for a first visual feature, the computer system can: identify a circularity feature template, in the set of feature templates contained in the dimension library, associated with the first visual feature; map a set of reference points onto the inspection image according to the circularity feature template; and generate a similarity score (e.g., 98%) between the first visual feature and the circularity feature template based on deviations of positions of the set of reference points relative the visual feature in the inspection image. Accordingly, in response to the similarity score exceeding the threshold similarity score, the computer system can then aggregate the visual features into the initial set of key features in the inspection image.

In this implementation, the computer system can then: select a subset of key features within the initial set of key features according to the limit (e.g., twenty) on the quantity of key features; and set the subset of key features, in the initial set of key features, as the set of key features in the inspection image. Therefore, the computer system can: prior to presentation of the inspection image to the user, predict a first quantity of key features (or "features of interest") in the inspection image; extract a set of real dimensions for the first quantity of key features from the inspection image; and automatically present the inspection image and the set of real dimensions to the user upon selection to view the inspection image by the user at the user portal. Alternatively, the computer system can: receive manual selection of the limit (e.g., ten, twenty, thirty) on the quantity of key features contained in the first set of key features; and/or toggle between limits on the quantity of key features during inspection of the inspection image by the user at the user portal.

In one implementation, the computer system can then: extract a set of real dimensions (e.g., distance measurement, circumference measurement) of the set of key features in the inspection image; and project the set of real dimensions proximal the set of key features onto the inspection image at the user portal associated with the user.

In one examplebased on geometric characteristics of a first feature template, in the set of feature templates, contained in the dimension library—the computer system can: identify a first key feature as corresponding to a set of corners in the first inspection image; extract a first real dimension corresponding to a distance (e.g., 4 millimeters) between the set of corners in the inspection image; and project the first real dimension interposed between the set of corners in the inspection image. In another examplebased on geometric characteristics of a second feature template, in the set of feature templates, contained in the dimension library—the computer system can: identify a second key feature as corresponding to a curve in the inspection image; extract a second real dimension corresponding to a radius of the curve in the inspection image; and project the second real dimension proximal (e.g., within ten millimeters) the second key feature in the inspection image. In yet another examplebased on geometric characteristics of a third feature template, in the set of feature templates, contained in the dimension library—the computer system can: identify a third key feature as corresponding to a parallelism between a set of edges in the inspection image; extract a third real dimension corresponding to an angle measurement between the set of edges from the inspection image; and project the third real dimension interposed between the set of edges in the inspection image. Thus, the computer system can then aggregate the first real dimension of the distance between the set of corners, the second real dimension of the radius of the curve, and the parallelism between the set of edges into the first set of real dimensions.

24.1 Dimension Queuing

In one implementation, the computer system can: prior to presentation of the inspection image to the user, predict a second set of key features-distinct from (or "exclusive of") the first set of key features—in the inspection image based on the set of feature templates contained in the dimension library; extract a second set of real dimensions of the second set of key features from the inspection images; and queue the second set of real dimensions for projecting onto the inspection image. Accordingly, in response to receiving selection to view the inspection image by the user, the computer system can: present the inspection image to the user at the user portal; project the first set of real dimensions proximal the first set of key features onto the first image at the user portal; and queue projection of the second set of real dimensions of the second set of key features in the inspection image. The computer system can thus toggle between projecting the first set of real dimensions of the first set of key features and the second set of real dimensions of the second set of key features during review of the inspection image by the user at the user portal.

In one example, the computer system can: during a first time period, project the first set of real dimensions proximal the first set of key features onto the inspection image during review of the inspection image by the user; and, during a second time period following the first time period, project the second set of real dimensions proximal the second set of key features onto the inspection image during review of the inspection image by the user. In another example—for each key feature, in the second set of key features—the computer system can define a boundary (e.g., boundary box) about the key feature in the inspection image. The computer system can then: detect intersection of a cursor and the boundary of a key feature, in the second set of key features, at the user portal; and, in response to detecting the intersection, project a real dimension of the key feature onto the inspection image at the user portal.

Therefore, the computer system can toggle viewing of real dimensions between a first set of predicted key features and a second set of predicted key features in an inspection image during review by the user.

24.2 Visual Deviation+Key Features

In one implementation, the computer system can: as described above, detect a visual deviation in a first inspection image based on differences between the first inspection image and a second or template inspection image; and generate a bounding box within a region in the first inspection image encompassing the visual deviation. The computer system can then: predict a first set of key features in the bounding box of the first inspection image based on the set of feature templates contained in the dimension library; and extract a first set of real dimensions of the first set of key features from the region in the inspection image. Therefore, the computer system can: as described above, correlate the first set of key features to the visual deviation within the region of the inspection image; and identify a real dimension, in the first set of real dimensions, exceeding a threshold deviation (e.g., +/−0.01 millimeters) from a target real dimension; and flag the real dimension for manual review by the user at the user portal.

25. Confirming Key Features

Block S140 of the method S100 recites receiving confirmation of a first subset of key features, in the first set of key features, from the user at the user portal. Generally, the computer system can: project the set of real dimensions proximal the set of key features onto the inspection image at the user portal; and, at the user portal, receive confirmation of a subset of key features (e.g., edges, corners), in the set of key features, from the user interfacing with the user portal.

In one implementation, the computer system can: in response to receiving a selection to view an inspection image by a user at the user portal, generate a prompt requesting a user to confirm key features, in the set of key features, in the inspection image; and serve the prompt to the user portal during review of the inspection image by the user. The computer system can then: receive confirmation of a key feature in the inspection image, such as by detecting a click-input from a cursor proximal the key feature in the inspection image; initialize a feature container representative of confirmed key features from the user; and aggregate the selected key feature into the feature container.

Thus, the computer system can: track confirmed key features across inspection images reviewed by the user; and generate a feature container representing preferences of key features selected by the user across reviewed inspection images at the user portal. The computer system can then, as described below, propagate (e.g., forwards, backwards) identification of the confirmed key features across a set of inspection images.

26. Predicting Key Features: Second Image

Blocks S150, S152, and S160 of the method S100 recite: predicting a second set of key features in the second inspection image based on the set of feature templates contained in the dimension library and the first subset of key features selected by the user; extracting a second set of real dimensions of the second set of key features from the second inspection image; and projecting the second set of real dimensions proximal the second set of key features onto the second inspection image at the user portal.

Generally, prior to presentation of the second inspection image to the user, the computer system can: leverage the confirmed key features in the first inspection image and the dimension library in order to predict a second set of key features in the second inspection image that are distinct from (or "exclusive of") key features in the first inspection image not confirmed by the user; and extract a second set of real dimensions of the second set of key features from the second inspection image. More specifically, the computer system can: identify a first subset of key features, confirmed by the user in the first set of key features in the first inspection image, in the second inspection image; as described above, predict a second subset of key features in the second inspection image based on the set of feature templates contained in the dimension library; and aggregate the first subset of key features and the second subset of key features into the second set of key features in the second inspection image. Thus, the computer system can: prior to presentation of the second inspection image to the user, predict a second set of key features in the second inspection images that includes previously-confirmed key features by the user; extract real dimensions of the second set of key features from the second inspection images; and in response to receiving a selection to the view the second inspection image by the user, present the inspection image and the real dimensions to the user.

In one implementation, the computer system can; at the user portal, receive selection of a first key feature in a first inspection image from a user; and, as described above, predict a first set of key features proximal the first key feature in the first inspection image based on the set of feature templates contained in the dimension library. The computer system can then: receive confirmation of the first key feature from the user at the user portal; and receive confirmation of a first subset of key features, in the first set of key features, proximal the first key feature in the first inspection image from the user. Accordingly, prior to presentation of the second inspection image to the user, the computer system can: identify the first key feature confirmed by the user in the second inspection image; identify the first subset of key features confirmed by the user in the second inspection image; and predict a second subset of key features-distinct from (or "exclusive of") key features not confirmed by the user in the first set of key features—in the second inspection image based on the set of feature templates contained in the dimension library. The computer system can then: aggregate the first key feature, the first subset of key features, and the second subset of key features into the second set of key features in the second inspection image; extract a second set of real dimensions of the second set of key features in the second inspection image; and, in response to receiving selection to view the second inspection image from the user, project the second set of real dimensions proximal the second set of key features in the second inspection image.

Therefore, the computer system can: prior to presentation of the second inspection image to the user, automatically predict a second set of key features in the second inspection image; extract real dimensions of the second set of key features from the second inspection image; and render the second inspection image and the real dimensions of the second set of key features at the user portal for review by the user.

In one example, the computer system can receive selection of a first key feature corresponding to a set of edges in the first inspection image. The computer system can then, based on the set of feature templates contained in the dimension library: identify a first flat region adjacent a first edge, in the set of edges, in the first inspection image; identify a second flat region adjacent a second edge, opposite the first edge, in the set of edges in the first inspection image; identify a parallelism between the first edge and the second edge; and identify a perpendicularity of the first edge and a third edge extending between the first edge and the second edge. Accordingly, in response to receiving confirmation of the first key feature in the first inspection images by the user, the computer system can: identify the first key feature, confirmed by the user, in the second inspection image; and, as described above, predict a second set of key features proximal the first key feature in the second inspection image based on the set of feature templates contained in the dimension library.

Therefore, the computer system can: prior to presentation of the second inspection image to the user, automatically predict a second set of key features in the second inspection image based on the dimension library and previously-confirmed key features by the user; and, in response to selection of the second inspection image by the user, render the second inspection image and real dimensions for the second set of key features for review by the user.

26.1 Example: Key Feature Quantity Limit

In one example, the computer system can: predict a first set of key features—according to a target limit of twenty features—in the first inspection image based on the set of feature templates contained in the dimension library; extract a first set of real dimensions of the first the first set of key features from the first inspection image; and project the first set of real dimensions proximal the first set of key features onto the first inspection image. The computer system can then: receive confirmation of three key features of the twenty features contained in the first set of key features from the user; prior to presentation of a second inspection image to the user, identify the three key features confirmed by the user in the second inspection image; and predict seventeen new key features-distinct from (or "exclusive of") the seventeen key features in the first set of key features not confirmed by the user—in the second inspection image based on the set of feature templates contained in the dimension library. Furthermore, the computer system can: aggregate the three key features confirmed by the user and the seventeen new features into a second set of key features-according to the target limit of twenty features—in the second inspection image; extract a second set of real dimensions of the second set of key features from the second inspection image; and, in response to receiving a selection to view the second inspection image from the user, project the second set of real dimensions proximal the second set of key features onto the second inspection image for review by the user.

Therefore, the computer system can: serve a sequence of inspection images to a user portal associated with a user; and automatically render real dimensions of a set of key features, according to a target limit (e.g., twenty) on the quantity of key features, in each inspection image.

27. Propagating Key Features

Generally, the computer system can: propagate the confirmed key features and the dimension library across a set of inspection images to automatically predict key features preferred by the user in the set of inspection images prior to presentation of the set of inspection images to the user; and automatically render real dimensions of these key features onto an inspection image in response to receiving a selection to view the inspection image by the user.

In one implementation, the computer system can access a sequence of inspection images of a set of assembly units, at the target assembly stage, recorded by an optical inspection station during production of the set of assembly units. In this implementation, the computer system can then: retrieve the first inspection image, from the sequence of inspection images, of the first assembly unit at a first assembly stage during production of the set of assembly units; as described above, predict a first set of key features in the first inspection image based on geometric characteristics of feature templates contained in the dimension library; and project a first set of real dimensions of the first set of key features onto the first inspection image. Additionally, the computer system can: retrieve the second inspection image, from the sequence of inspection images, of the second assembly unit at a second assembly stage, different from the first assembly stage, during production of the set of assembly units; as described above, predict a second set of key features in the second inspection image based on confirmed key features in the first set of key features and geometric characteristics of feature templates contained in the dimension library; and project a second set of real dimensions of the second set of key features onto the second inspection image. Therefore, the computer system can predict key features across a set of inspection images depicting different assembly units at different assembly stages during production of the assembly units.

In another implementation, the computer system can: access a third inspection image of the second assembly unit (i.e., the same assembly unit depicted in the second inspection image) at a third assembly stage, different from the second assembly stage, during production of the second assembly unit; based on the set of feature templates contained in the dimension library, predict a third set of key features-distinct from (or "exclusive of") the second set of key features in the second inspection image—in the third inspection image; extract a third set of real dimensions of the third set of key features from the third inspection image; present the third inspection image at the user portal; and project the third set of real dimensions proximal the third set of key features onto the third inspection image at the user portal. Therefore, the computer system can avoid redundancy in projection of real dimensions of key features across inspection images of the same assembly unit.

In another implementation, in response to receiving confirmation of key features in the first set of key features in the first inspection image, the computer system can: access an initial inspection image-preceding the first inspection image in a sequence of inspection images—of an initial assembly unit at an initial assembly stage, different from the first assembly stage, during production of the set of assembly units; and, prior to presentation of the initial inspection image to the user, predict a third set of key features in the initial inspection image based on the set of feature templates contained in the dimension library and the first subset of key features selected by the user. As described above the third set of key features includes: the first subset of key features selected by the user; and a subset of key features distinct from (or "exclusive of") key features in the first set of key features, not confirmed by the user. Accordingly, the computer system can then: extract a third set of real dimensions of the third set of key features in the initial inspection image; present the initial inspection image at the user portal; and project the third set of real dimensions proximal the third set of key features onto the initial inspection image at the user portal.

28. User Portal

In one implementation, in response to receiving a selection to review an inspection image, the computer system can: project the set of real dimensions proximal the set of key features onto the inspection image; and project the set of real dimensions at a nominal opacity (e.g., 80% opacity) onto the inspection image. In this implementation, in response to the user navigating a cursor proximal a key feature, in the set of key features, in the inspection image at the user portal, the computer system can: set a first opacity (e.g., 95% opacity), greater than the nominal opacity (e.g., 80% opacity), to a first real dimension, projected onto the first inspection image, associated with the first key feature; and set a second opacity (e.g., 50% opacity), less than the nominal opacity (e.g., 80% opacity), to a subset of real dimensions-excluding the first real dimension-projected onto the first inspection image. Therefore, the computer system can adjust (e.g., increase, decrease) opacity of real dimensions projected onto the inspection image as the user navigates a cursor over the inspection image.

In another implementation, in response to the user navigating a cursor proximal a particular key feature—in the first set of key features—in the inspection image, the computer system can: identify a second set of key features proximal (e.g., within ten millimeters) the particular key features in the inspection image; extract a second set of real dimensions of the second set of key features from the inspection image; and project the second set of real dimensions of the second set of key features onto the inspection image. Therefore, rather than rendering a real dimension of a key feature in response to manual selection of the key feature in the inspection image by the user, the computer system can automatically render real dimensions of key features over the inspection image during navigation of a cursor over the inspection image.

In yet another implementation, in response to receiving selection of a first pixel in the inspection image by the user at the user portal, the computer system can: identify a first key feature proximal the first pixel in the inspection image based on the set of feature templates contained in the dimension library; extract a first real dimension of the first key feature from the inspection image; project the first real dimension proximal (e.g., within five millimeters) the first key feature onto the inspection image; and, in response to receiving confirmation of the first key feature from the user at the user portal, aggregate the first key feature into the first set of key features in the inspection image. Therefore, in response to manual selection of a key feature in the inspection image, the computer system can project a real dimension of the key feature onto the inspection image.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for automatically measuring features across multiple assembly units comprising:

accessing a dimension library containing a set of feature templates associated with geometric characteristics of predefined features in recorded inspection images of assembly units;

accessing a first inspection image of a first assembly unit;

prior to presentation of the first inspection image to a user:

predicting a first set of key features in the first inspection image based on the set of feature templates contained in the dimension library; and extracting a first set of real dimensions of the first set of key features from the first inspection image;

presenting the first inspection image to the user via a user portal;

projecting the first set of real dimensions proximal the first set of key features onto the first inspection image at the user portal;

accessing a second inspection image of a second assembly unit;

prior to presentation of the second inspection image to the user:

predicting a second set of key features in the second inspection image based on the set of feature templates contained in the dimension library and a first subset of key features selected by the user in the first set of key features, the second set of key features comprising:

the first subset of key features confirmed by the user; and a second subset of key features distinct from unconfirmed unselected features in the first set of key features; and extracting a second set of real dimensions of the second set of key features from the second inspection image;

presenting the second inspection image to the user via the user portal; and projecting the second set of real dimensions proximal the second set of key features onto the second inspection image at the user portal.

2. The method of claim 1, wherein extracting the first set of real dimensions of the first set of key features comprises:

accessing a first feature template from the set of feature templates in the dimension library, the first feature template:

defining a first geometric characteristic; and comprising a first rule for extracting dimensions between a set of corners;

matching a first key feature, in the first set of key features, to the first geometric characteristic;

in response to matching the first key feature to the first geometric characteristic and based on the first rule:

identifying a first set of corners corresponding to the first key feature; and extracting a first real dimension, between the first set of corners, from the first inspection image;

accessing a second feature template from the set of feature templates in the dimension library, the second feature template:

defining a second geometric characteristic, distinct form the first geometric characteristic; and comprising a second rule for extracting dimensions of a curve;

matching a second key feature, in the first set of key features, to the second geometric characteristic;

in response to matching the second key feature to the second geometric characteristic and based on the second rule: )

identifying a first curve corresponding to the second key feature; and extracting a second real dimension of the first curve from the first inspection image; and aggregating the first real dimension and the second real dimension into the first set of real dimensions.

3. The method of claim 1, wherein predicting the first set of key features in the first inspection image comprises:

accessing a first limit on a quantity of key features contained in the first set of key features;

extracting a set of features from the first inspection image;

for each feature, in the set of features:

identifying a feature template, in the set of feature templates contained in the dimension library, associated with the feature;

generating a similarity score between the feature in the first inspection image and the feature template; and in response to the similarity score exceeding a threshold similarity score, aggregating the feature into an initial set of key features;

selecting a subset of key features within the initial set of key features according to the first limit on the quantity of key features; and setting the subset of key features as the first set of key features in the first inspection image.

4. The method of claim 3:

wherein accessing the first limit on the quantity of features contained in the first set of key features comprises accessing a limit of twenty key features contained in the first set of key features;

further comprising selecting the first subset of key features comprising three key features of twenty key features contained in the first set of key features; and wherein predicting the second set of key features in the second inspection image comprises:

identifying the three key features, in the first set of key features, in the second inspection image;

based on the geometric characteristics of the set of feature templates contained in the dimension library, predicting seventeen key features in the second inspection image distinct from seventeen unselected features in the first set of key features; and aggregating the three key features and the seventeen key features into the second set of key features according to the limit of twenty key features.

5. The method of claim 1:

wherein projecting the first set of real dimensions onto the first inspection image at the user portal comprises, for each real dimension, in the first set of real dimensions:

projecting the real dimension proximal a key feature, in the first set of key features, onto the first inspection image; and projecting the real dimension at a nominal opacity onto the first inspection image; and further comprising, in response to the user navigating a cursor proximal a first key feature, in the first set of key features, in the first inspection image at the user portal:

setting a first opacity, greater than the nominal opacity, to a first real dimension, in the first set of real dimensions projected onto the first inspection image, associated with the first key feature; and setting a second opacity, less than the nominal opacity, to a subset of real dimensions, in the first set of real dimensions projected onto the first inspection image, excluding the first real dimension.

6. The method of claim 1:

further comprising receiving selection of a first key feature in the first inspection image from the user at the user portal;

wherein predicting the first set of key features in the first inspection image comprises predicting the first set of key features, proximal the first key feature, in the first inspection image based on the set of feature templates contained in the dimension library;

further comprising selecting the first subset of key features, in the first set of key features, proximal the first key feature in the first inspection image from the user; and wherein predicting the second set of key features in the second inspection image comprises:

identifying the first key feature in the second inspection image;

identifying the first subset of key features, proximal the first key feature, in the second inspection image;

predicting the second subset of key features, proximal the first key feature, in the second inspection image based on the set of feature templates contained in the dimension library; and aggregating the first key feature, the first subset of key features, and the second subset of key features into the second set of key features.

7. The method of claim 6:

wherein receiving selection of the first key feature in the first inspection image comprises receiving selection of a distance between a set of edges from the user; and wherein predicting the first set of key features, proximal the first key feature, in the first inspection image comprises:

identifying a first flat region adjacent a first edge in the set of edges;

identifying a second flat region adjacent a second edge, opposite the first edge, in the set of edges;

identifying a parallelism between the first edge and the second edge; and identifying a perpendicularity of the first edge and a third edge extending between the first edge and the second edge.

8. The method of claim 1:

further comprising accessing a sequence of inspection images of a set of assembly units, at the target assembly stage, recorded by an optical inspection station during production of the set of assembly units;

wherein accessing the first inspection image comprises accessing the first inspection image, from the sequence of inspection images, of the first assembly unit at a first assembly stage during production of the set of assembly units; and wherein accessing the second inspection image comprises accessing the second inspection image, from the sequence of inspection images, of the second assembly unit at a second assembly stage, different from the first assembly stage, during production of the set of assembly units.

9. The method of claim 1:

further comprising accessing an initial inspection image of an initial assembly unit at a target assembly stage during production of the initial assembly unit;

wherein accessing the first inspection image comprises accessing the first inspection image of the first assembly unit at the first assembly stage during production of the first assembly unit;

further comprising:

identifying a visual deviation at a first location in the first inspection image based on a difference between the first inspection image and the initial inspection image; and generating a boundary box encompassing the first location in the first inspection image; and wherein predicting the first set of key features comprises predicting the first set of key features within the boundary box in the first inspection image based on the set of feature templates contained within the dimension library.

10. The method of claim 1:

wherein accessing the second inspection image comprises accessing the second inspection image of the second assembly unit at a first assembly stage during production of the second assembly unit; and further comprising:

accessing a third inspection image of the second assembly unit at a second assembly stage, different from the first assembly stage, during production of the second assembly unit;

based on the set of feature templates contained in the dimension library, predicting a third set of key features, in the third inspection image, distinct from the second set of key features;

extracting a third set of real dimensions of the third set of key features from the third inspection image;

presenting the third inspection image at the user portal; and projecting the third set of real dimensions proximal the third set of key features onto the third inspection image at the user portal.

11. The method of claim 1, further comprising:

prior to presentation of the first inspection image to the user:

identifying a set of features in the first the first inspection image; and identifying absence of a feature template, in the set of feature templates contained in the dimension library, associated with a first feature in the first set of features;

generating a prompt requesting the user to generate a first feature template corresponding to the first feature;

serving the prompt to the user portal;

receiving selection of a measurement type for the first feature from the user at the user portal;

mapping a first set of reference points at the first feature according to the measurement type;

extracting a first real dimension of the first feature from the first inspection images based on the first set of reference points;

generating a first feature template of the first feature based on the first real dimension and the first set of reference points; and aggregating the first feature template into the set of feature templates contained in the dimension library.

12. The method of claim 1, in response to the user navigating a cursor proximal a particular key feature, in the second set of key features, in the second inspection image at the user portal, further comprising:

identifying third set of key features proximal the particular key feature in the second inspection image;

extracting a third set of real dimensions of the third set of key features from the second inspection image; and projecting the third set of real dimensions proximal the third set of key features onto the second inspection image at the user portal.

13. The method of claim 1:

further comprising accessing a sequence of inspection images of a set of assembly units, at the target assembly stage, recorded by an optical inspection station during production of the set of assembly units;

wherein accessing the first inspection image comprises accessing the first inspection image, from the sequence of inspection images, of the first assembly unit at a first assembly stage during production of the set of assembly units; and further comprising:

accessing an initial inspection image, in the sequence of inspection images preceding the first inspection image, of an initial assembly unit at an initial assembly stage, different from the first assembly stage, during production of the set of assembly units;

prior to presentation of the initial inspection image to the user:

predicting a third set of key features in the initial inspection image based on the set of feature templates contained in the dimension library and the first subset of key features selected by the user, the third set of key features comprising:

the first subset of key features selected by the user; and a subset of key features distinct from unconfirmed unselected features in the first set of key features; and extracting a third set of real dimensions of the third set of key features from the initial inspection image;

presenting the initial inspection image at the user portal; and projecting the third set of real dimensions proximal the third set of key features onto the initial inspection image at the user portal.

14. The method of claim 1, further comprising in response to receiving selection of a first pixel in the first inspection image:

identifying a first key feature proximal the first pixel in the first inspection image based on the set of feature templates contained in the dimension library;

extracting a first real dimension of the first key feature from the first inspection image;

projecting the first real dimension proximal the first key feature onto the first inspection image at the user portal; and aggregating the first key feature into the first set of key features.

15. The method of claim 1, further comprising:

predicting a third set of key features in the second inspection image based on the set of feature templates contained in the dimension library, the third set of key features distinct from the second set of key features; and for each key feature, in the third set of key features:

defining a boundary box about the key feature in the second inspection image; and in response to the user navigating a cursor intersecting the boundary box about the key feature:

extracting a real dimension of the key feature from the second inspection image; and projecting the real dimension proximal the key feature onto the second inspection image at the user portal.

16. A method for automatically measuring features across multiple assembly units comprising:

accessing a dimension library containing a set of feature templates associated with geometric characteristics of predefined features in recorded inspection images of assembly units;

during a first time period:

accessing a first inspection image of a first assembly unit;

predicting a first set of key features in the first inspection image based on the set of feature templates contained in the dimension library;

extracting a first set of real dimensions of the first set of key features from the first inspection image;

presenting the first inspection image to a user via a user portal; and projecting the first set of real dimensions proximal the first set of key features onto the first inspection image at the user portal; and during a second time period following the first time period:

accessing a second inspection image of a second assembly unit;

identifying a first subset of key features, in the first set of key features detected in the first inspection image, in the second inspection image;

predicting a second set of key features in the second inspection image based on the set of feature templates contained in the dimension library;

extracting a second set of real dimensions of the first subset of key features and the second set of key features from the second inspection image;

presenting the second inspection image at the user portal; and projecting the second set of real dimensions proximal the second set of key features onto the second inspection image at the user portal.

17. The method of claim 16, wherein predicting the second set of key features based on the set of feature templates contained in the dimension library comprises predicting the second set of key features distinct from unselected features in the first set of key features.

18. The method of claim 16:

accessing a first limit on a quantity of key features contained in the first set of key features;

extracting a set of features from the first inspection image;

for each feature, in the set of features:

identifying a feature template, in the set of feature templates contained in the dimension library, associated with the feature;

generating a similarity score between the feature in the first inspection image and the feature template; and in response to the similarity score exceeding a threshold similarity score, aggregating the feature into an initial set of key features;

selecting a subset of key features within the initial set of key features according to the first limit on the quantity of key features; and setting the subset of key features as the first set of key features in the first inspection image.

19. The method of claim 16:

further comprising receiving selection of a first key feature in the first inspection image from the user at the user portal;

wherein predicting the first set of key features in the first inspection image comprises predicting the first set of key features, proximal the first key feature, in the first inspection image based on the set of feature templates contained in the dimension library;

further comprising:

selecting the first key feature in the first inspection image; and selecting the first subset of key features, in the first set of key features, proximal the first key feature in the first inspection image;

wherein identifying the first subset of key features in the second inspection image comprises:

identifying the first key feature in the second inspection image; and identifying the first subset of key features, proximal the first key feature, in the second inspection image; and wherein predicting the second set of key features comprises predicting a second set of key features, proximal the first key feature, in the second inspection image based on the set of feature templates contained in the dimension library.

20. A method for automatically measuring features across multiple assembly units comprising:

accessing a dimension library containing a set of feature templates associated with geometric characteristics of predefined features in recorded inspection images of assembly units;

accessing a first inspection image of a first assembly unit;

prior to presentation of the first inspection image to a user:

predicting a first set of key features in the first inspection image based on the set of feature templates contained in the dimension library; and extracting a first set of real dimensions of the first set of key features from the first inspection image;

presenting the first inspection image to a user via a user portal;

projecting the first set of real dimensions proximal the first set of key features onto the first inspection image at the user portal; and predicting a second set of key features, distinct from unselected features in the first set of key features, in the first inspection image based on the set of feature templates contained in the dimension library;

extracting a second set of real dimensions of the first subset of key features and the second set of key features from the first inspection image; and projecting the second set of real dimensions proximal the second set of key features onto the first inspection image at the user portal.

* * * * *